United States Patent
Masuda et al.

(10) Patent No.: US 7,132,824 B2
(45) Date of Patent: Nov. 7, 2006

(54) POSITION DETECTOR, CAMERA-SHAKE COMPENSATION MECHANISM, AND IMAGE CAPTURE APPARATUS

(75) Inventors: Satoshi Masuda, Kyoto (JP); Yoshihiro Hara, Kishiwada (JP)

(73) Assignee: Konica Minolta Photo Imaging, Inc., Tokyo (JP)

(*) Notice: Subject to any disclaimer, the term of this patent is extended or adjusted under 35 U.S.C. 154(b) by 96 days.

(21) Appl. No.: 10/990,013

(22) Filed: Nov. 16, 2004

(65) Prior Publication Data

US 2005/0258825 A1  Nov. 24, 2005

(30) Foreign Application Priority Data

May 20, 2004 (JP) ............................. 2004-150705

(51) Int. Cl.
*G01B 7/14* (2006.01)
(52) U.S. Cl. ..................... 324/207.12; 324/207.2; 324/207.24; 324/207.26
(58) Field of Classification Search ........... 324/207.12, 324/207.2, 207.21, 207.24, 207.25, 207.26, 324/225; 338/32 H, 32 R
See application file for complete search history.

(56) References Cited

U.S. PATENT DOCUMENTS

| 4,415,856 A | * | 11/1983 | Welles .................... 324/207.25 |
| 4,746,859 A | * | 5/1988 | Malik .................... 324/207.12 |
| 6,154,027 A | * | 11/2000 | Alexander et al. .......... 324/251 |

FOREIGN PATENT DOCUMENTS

| JP | 7-190800 A | 7/1995 |
| JP | 2001-91298 A | 4/2001 |
| JP | 2002-182846 A | 6/2002 |
| JP | 2003-75108 A | 3/2003 |

* cited by examiner

*Primary Examiner*—Jay M. Patidar
(74) *Attorney, Agent, or Firm*—Sidley Austin LLP

(57) ABSTRACT

A position detector includes a magnet, a pair of Hall effect devices, and a processing circuit for detecting relative positions of the magnet and the pair of Hall effect devices. The processing circuit detects a difference in magnitude between output values of the Hall effect devices, as position outputs, with an input value to each of the Hall effect devices being controlled such that a sum of magnitudes of respective output values of the Hall effect devices is constant.

12 Claims, 15 Drawing Sheets

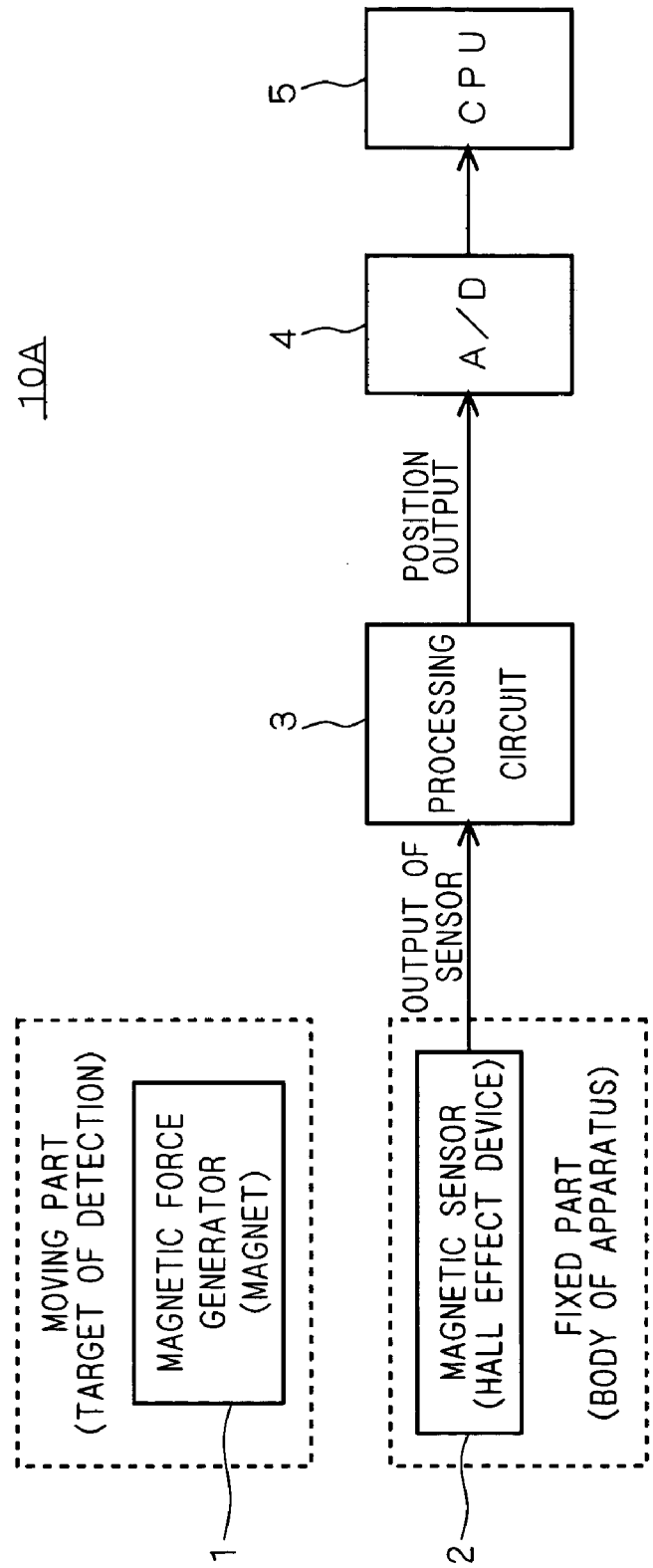

FIG. 2
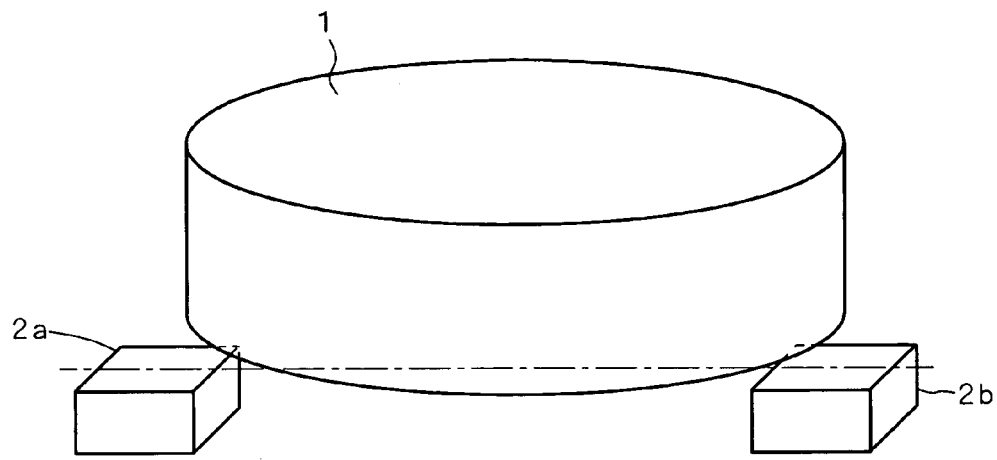
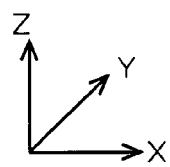
FIG. 3
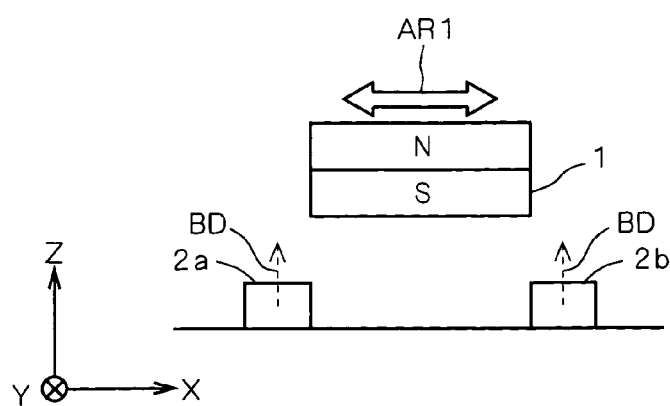

F I G . 8
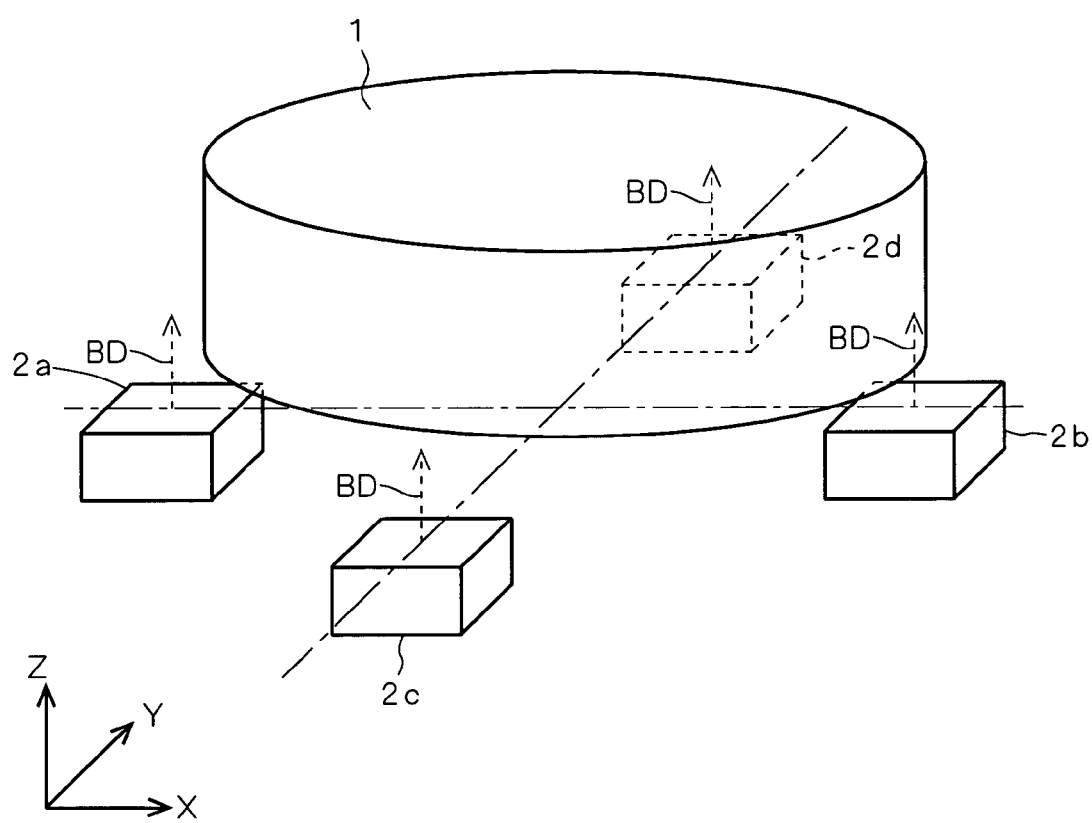

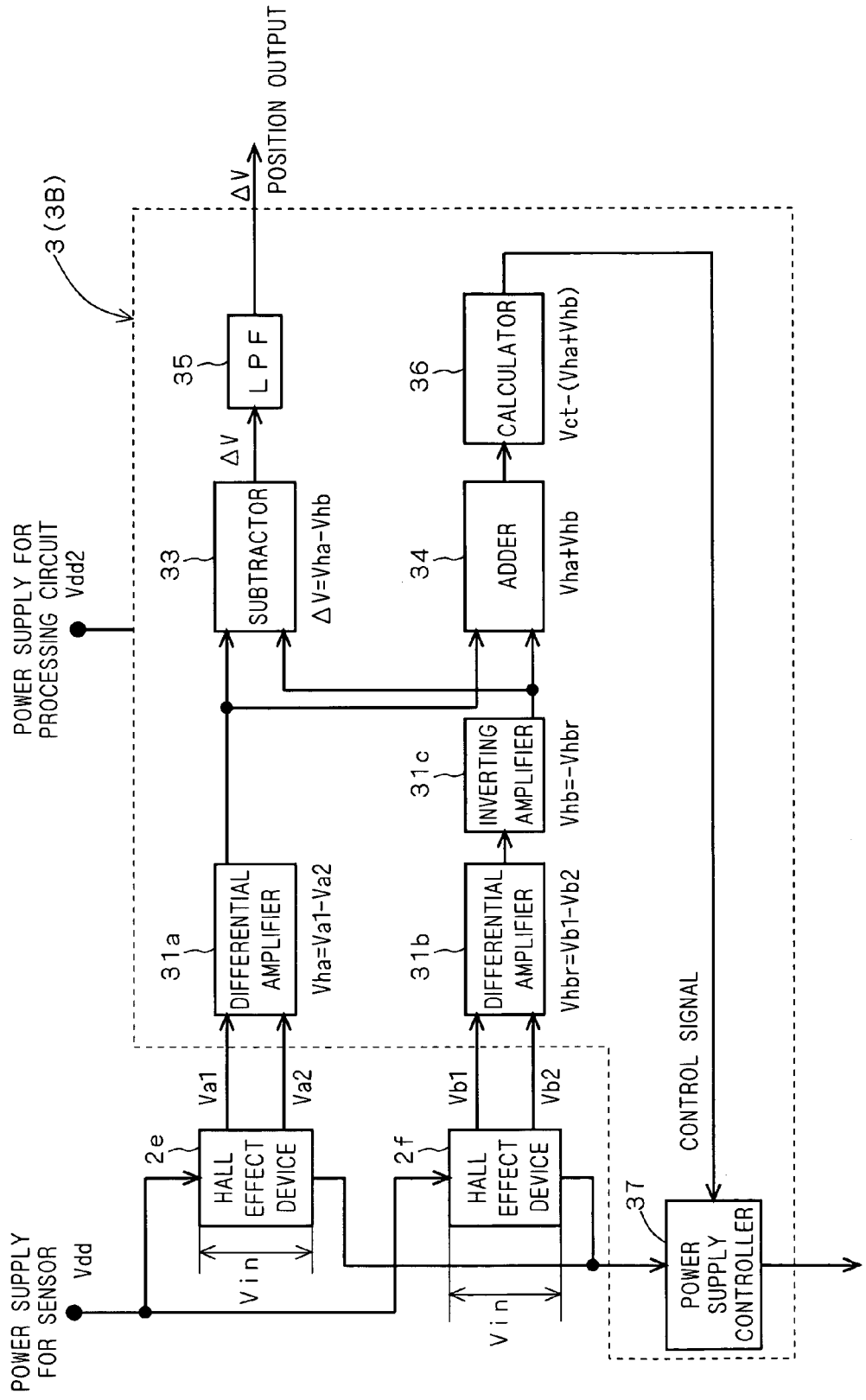

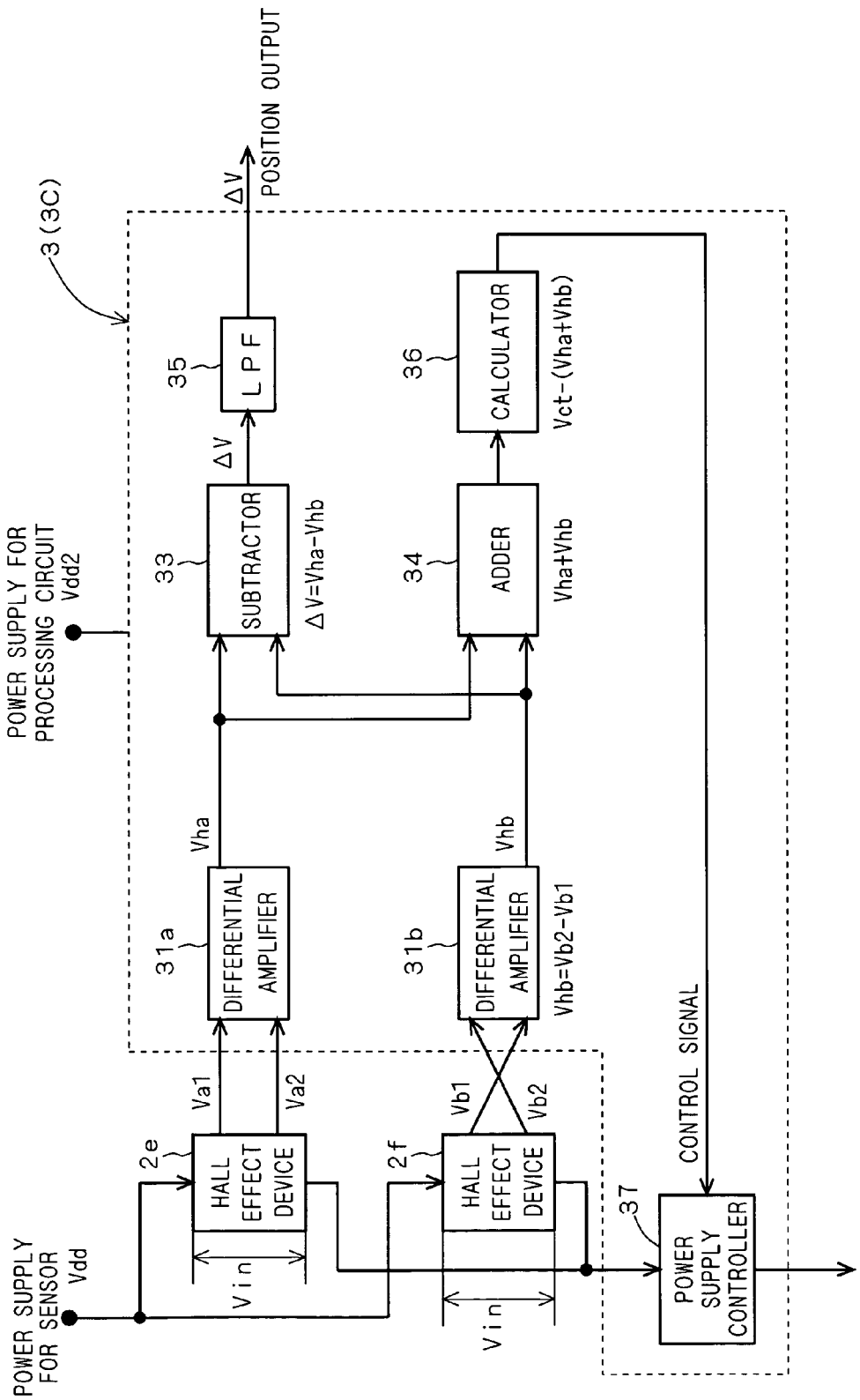

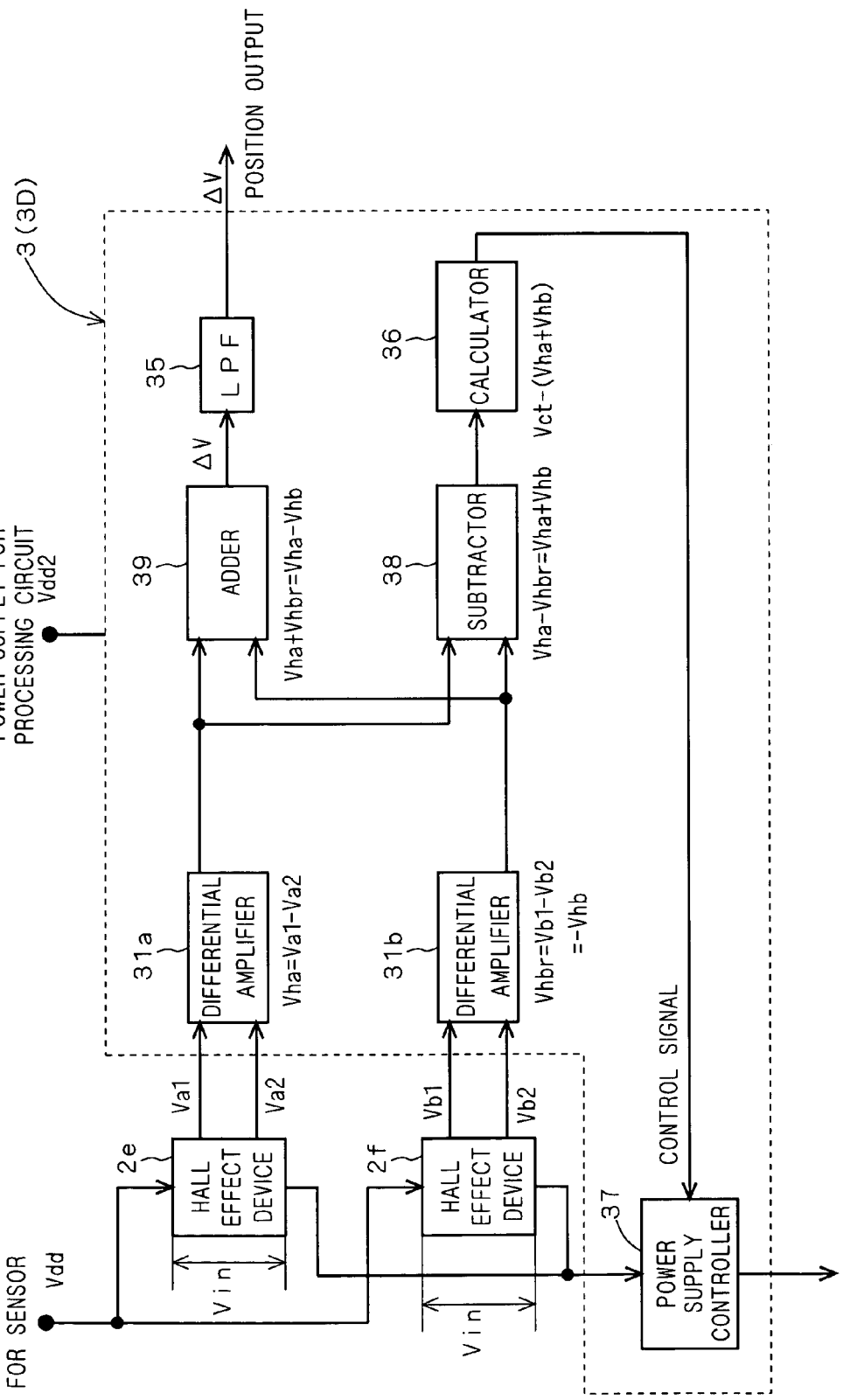

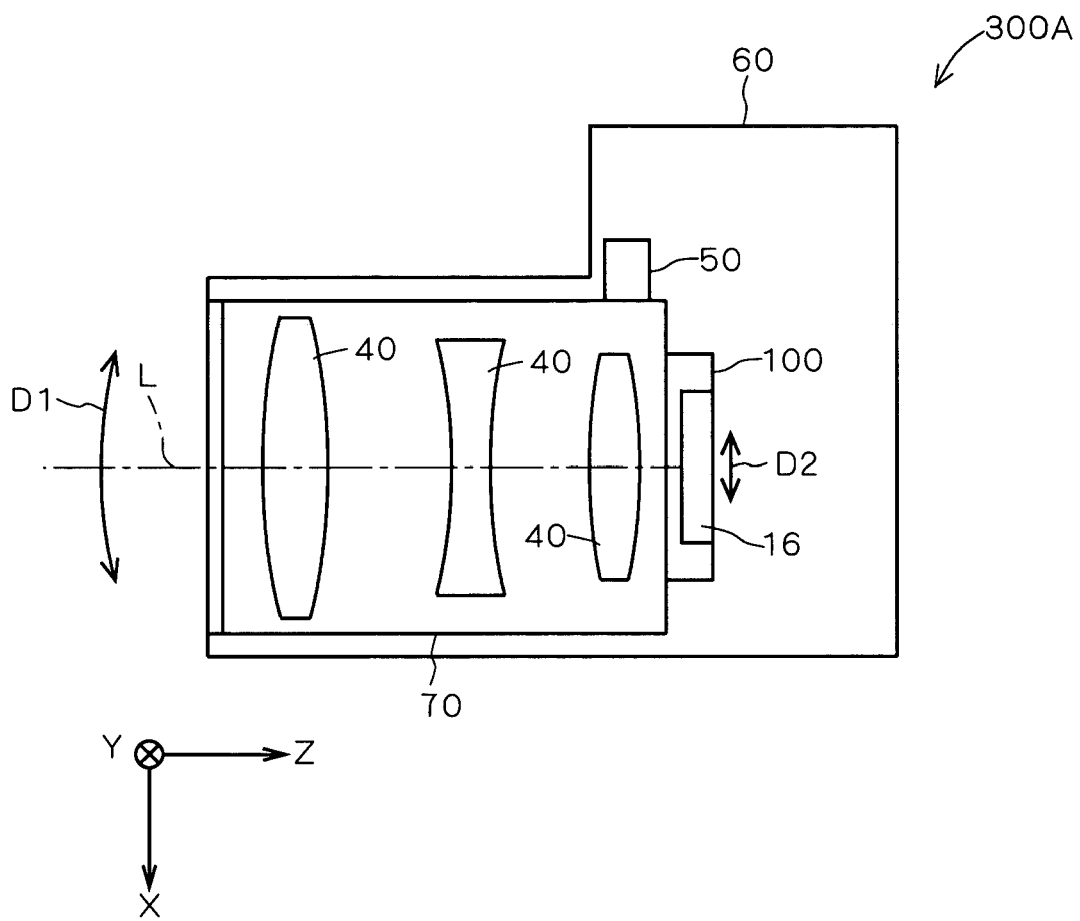
F I G . 1 3

POSITION DETECTOR, CAMERA-SHAKE COMPENSATION MECHANISM, AND IMAGE CAPTURE APPARATUS

This application is based on application No. 2004-150705 filed in Japan, the contents of which are hereby incorporated by reference.

BACKGROUND OF THE INVENTION

1. Field of the Invention

The present invention relates to a position detector for detecting relative positions of two objects, and a camera-shake compensation mechanism and an image capture apparatus, each of which utilizes the position detector.

2. Description of the Background Art

There are various types of position detectors for detecting relative positions of two objects (a linear encoder, for example).

In order to meet demands for smaller size, lower cost, lower power consumption and the like, it is preferable to employ a position detector of a magnetic type which uses a permanent magnet (a magnetic force generator) and a Hall effect device (a magnetic sensor), among the various types of position detectors.

However, a Hall effect device and a magnet, characteristics of which are apt to vary greatly according to temperature, are susceptible to ambient temperature. Hence, it is desired to suppress influences of ambient temperature upon a Hall effect device and a magnet in using a Hall effect device and a magnet.

As one solution to suppress such influences of ambient temperature, Japanese Patent Application No. 2001-91298 (which will hereinafter be referred to as "JP No. 2001-91298) suggests one technique. According to the technique suggested by JP No. 2001-91298, a quotient of output values of two Hall effect devices (magnetic sensors), or an output-value ratio between two Hall effect devices, is obtained as an output representing a position (which will be hereinafter referred to as a "position output"), to thereby compensate for influences of temperature.

In the meantime, in order to improve accuracy in position detection performed by the above-described magnetic position detector, it is desirable to take into account influences of variation among individual magnets (which will be hereinafter referred to as "piece-to-piece variation"). In other words, it is desirable to compensate for piece-to-piece variation of magnets.

In this regard, the technique suggested by JP No. 2001-91298 can compensate for influences of temperature relatively easily. However, the technique suggested by JP No. 2001-91298 would have difficulties in suppressing influences of piece-to-piece variation. More specifically, to merely obtain a quotient of output values of two Hall effect devices (magnetic sensors), or an output-value ratio between two Hall effect devices, as the position output, could not easily compensate for influences of piece-to-piece variation of magnets. Additionally, influences of piece-to-piece variation of magnets may be compensated for by previously preparing an adjustment parameter adapted to cancel piece-to-piece variation of magnets for each position detector, and adjusting sensitivity using the adjustment parameter. However, to prepare the adjustment parameter for each position detector is an extremely laborious process, which is almost impossible.

SUMMARY OF THE INVENTION

It is therefore an object of the present invention to provide a position detector capable of easily compensating for influences of piece-to-piece variation, and techniques associated therewith.

In order to attain the foregoing object, according to a first aspect of the present invention, a position detector includes: a magnetic-sensor pair including magnetic sensors spaced from each other; a magnetic force generator; and a controller for detecting relative positions of the magnetic force generator and the magnetic-sensor pair on a predetermined axis based on respective output values of the magnetic sensors. The controller controls input values applied to the magnetic sensors such that a sum of magnitudes of the output values of the magnetic sensors is constant, and then detects a difference in magnitude between the output values of the magnetic sensors, as a position output.

With the position detector according to the first aspect of the present invention, it is possible easily to suppress an error in detection due to piece-to-piece variation.

According to a second aspect of the present invention, a position detector includes: a first magnetic-sensor pair including magnetic sensors spaced from each other along a first axis; a second magnetic-sensor pair including magnetic sensors spaced from each other along a second axis different from the first axis; a magnetic force generator; and a controller for carrying out two-dimensional detection of relative positions of the magnetic force generator and each of the first and second magnetic-sensor pairs based on respective output values of the magnetic sensors included in the first and second magnetic-sensor pairs. The controller controls input values applied to the magnetic sensors included in the first and second magnetic-sensor pairs such that a sum of magnitudes of the output values of the magnetic sensors in each of the first and second magnetic-sensor pairs is constant, and then detects a difference in magnitude between the output values of the magnetic sensors in the first magnetic-sensor pair and a difference in magnitude between the output values of the magnetic sensors in the second magnetic-sensor pair, as position outputs for positions on different axes, respectively.

With the position detector according to the second aspect of the present invention, it is possible easily to suppress an error in detection due to piece-to-piece variation.

According to a third aspect of the present invention, a position detector includes: a first magnetic-sensor pair including magnetic sensors spaced from each other along a first axis; a second magnetic-sensor pair including magnetic sensors spaced from each other along a second axis parallel to the first axis; a magnetic force generator; and a controller for detecting relative positions of the magnetic force generator and each of the first and second magnetic-sensor pairs on a predetermined axis based on respective output values of the magnetic sensors included in the first magnetic-sensor pair and/or the second magnetic sensor pair. The controller controls input values applied to the magnetic sensors included in the first and second magnetic-sensor pairs such that a sum of magnitudes of the output values of the magnetic sensors included in each of the first and second magnetic-sensor pairs is constant, and then detects a position output for a position on the predetermined axis based on at least one of a difference in magnitude between the output values of the magnetic sensors included in the first magnetic-sensor pair and a difference in magnitude between the output values of the magnetic sensors included in the second magnetic-sensor pair.

With the position detector according to the third aspect of the present invention, it is possible easily to suppress an error in detection due to piece-to-piece variation.

Further, the present invention is directed also to a camera-shake compensation mechanism and an image capture apparatus each of which includes any of the above-described position detectors. With the camera-shake compensation mechanism and the image capture apparatus, it is possible to suppress influences of piece-to-piece variation of magnets while meeting demands for size and cost reduction.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a schematic view of a structure of a position detector according to a first preferred embodiment.

FIG. 2 is a perspective view illustrating the physical configuration of parts forming the position detector.

FIG. 3 is a sectional view illustrating the physical configuration of parts forming the position detector.

FIG. 8 is a perspective view of a position detector according to a third preferred embodiment.

FIGS. 10, 11 and 12 illustrate modifications of the processing circuit.

FIG. 13 illustrates an image capture apparatus incorporating a position detector.

DESCRIPTION OF THE PREFERRED EMBODIMENTS

Below, preferred embodiments of the present invention will be described with reference to accompanying drawings.

A. First Preferred Embodiment

Overview of Structure

In a first preferred embodiment, description will be given by taking a position detector 10A for achieving one-dimensional position detection as an example. The position detector 10A is a linear encoder of a magnetic type.

Figure 4:
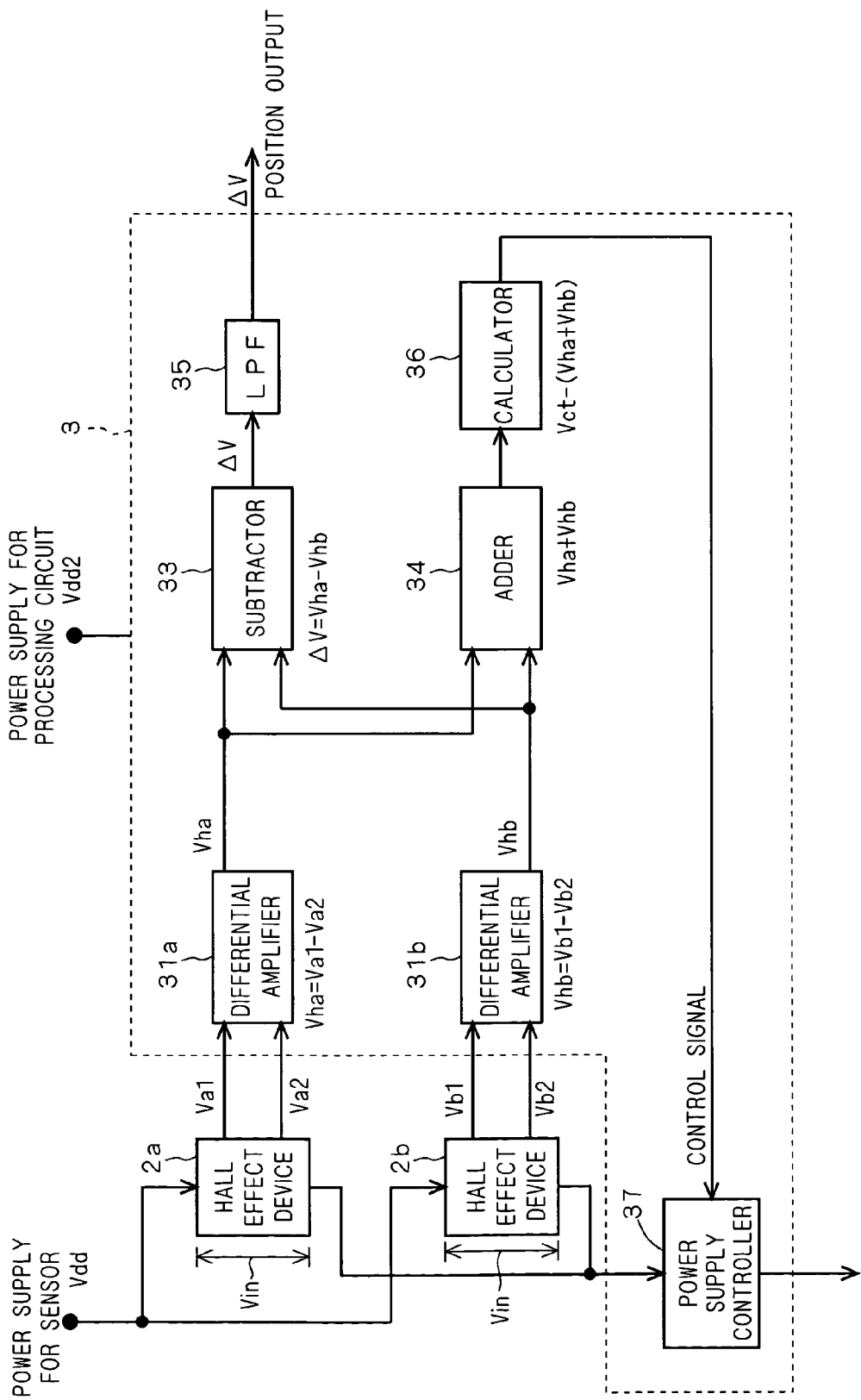
FIG. 4 illustrates an electrical processing circuit of the position detector.
Figure 5:
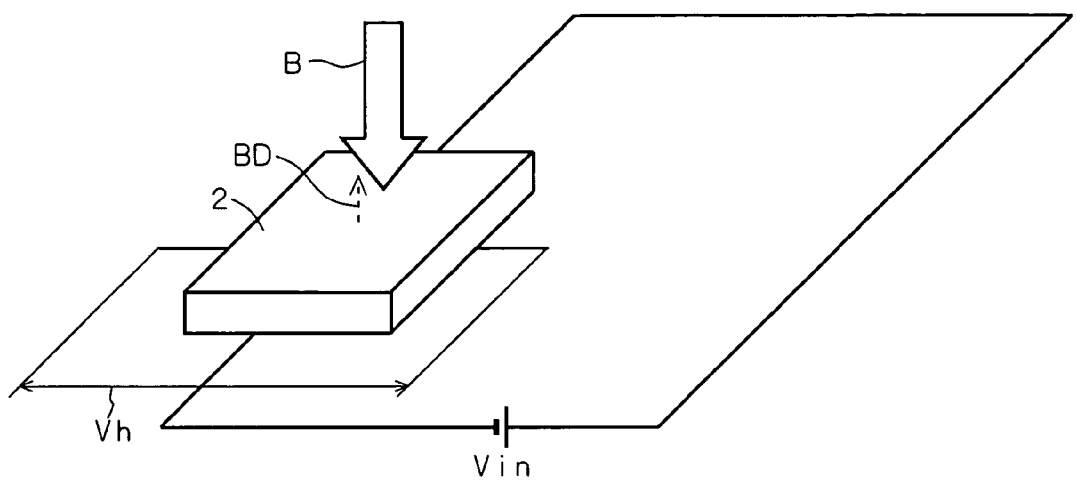
FIG. 5 shows a principle of position detection performed by a Hall effect device (magnetic sensor).

FIG. 1 schematically illustrates the position detector 10A. FIGS. 2 and 3 are a perspective view and a sectional view, respectively, both of which illustrate physical configuration of parts forming the position detector 10A. FIG. 4 illustrates an electrical processing circuit of the position detector 10A. Further, FIG. 5 shows a principle of position detection performed by a Hall effect device (magnetic sensor). It is additionally noted that though FIG. 1 illustrates a Hall effect device 2 as one unit for purposes of simplification, a plurality of Hall effect devices actually are provided, as later described in detail.

As illustrated in FIGS. 2 and 3, the position detector 10A includes one magnet (magnetic force generator) 1 and two Hall effect devices (in other words, one pair of Hall effect devices or one magnetic-sensor pair) 2a and 2b which are spaced from each other. In the present example, a magnet (more precisely, a permanent magnet) is employed as a magnetic force generator, and a Hall effect device is employed as a magnetic sensor. However, the present invention is not limited to such an example, and an electromagnet or the like alternatively be employed as a magnetic force generator, for example. Also, an MR device or the like alternatively can be employed as a magnetic sensor.

The magnet 1 is cylindrical, and an upper face and a bottom face thereof are magnetized to serve as a north pole and a south pole, respectively. It is additionally noted that respective positions of the north pole and the south pole can be interchanged with each other by change of circuit design.

The pair of Hall effect device 2a and 2b are attached to a part in a fixed section (a fixed part) such as a body of an apparatus for which position detection is supposed to be performed. The magnet 1 is attached to a part in a moving section (a moving part) which moves relative to the fixed part. Then, the magnet 1 attached to the moving part is movable relative to the pair of Hall effect devices 2a and 2b attached to the fixed part, as indicated by a two-headed arrow AR1 in FIG. 3 (along an X axis). More specifically, the magnet 1 is movable along the X axis along which the Hall effect devices 2a and 2b are arranged (i.e., along a space between the Hall effect devices 2a and 2b) in a plane parallel to a plane in which the Hall effect devices 2a and 2b are arranged. The position detector 10A detects a position of the magnet 1 relative to the pair of Hall effect devices 2a and 2b. In this regard, since the magnet (permanent magnet) 1, which requires no electric wiring, is attached to the moving part, installation of wiring in at least a portion of the moving part to which the magnet 1 is attached becomes unnecessary, thereby increase increasing flexibility in designing wiring.

The position detector 10A further includes a processing circuit 3, an A/D conversion circuit 4, and a CPU 5, as illustrated in FIG. 1. Outputs of the two Hall effect devices 2a and 2b are processed by the processing circuit 3, so that relative positions of the magnet 1 and the pair of Hall effect devices 2a and 2b on a predetermined axis (one-dimensional relative positions on the X axis in the present example) can be detected. In the present example, an analog signal indicative of the position output is outputted from the processing circuit 3 and subsequently converted into a digital signal by the A/D conversion circuit 4. Then, the digital signal is inputted to the CPU 5, where the digital signal is subjected to various processing. Details about processing carried out by the processing circuit 3 will be later described. It is noted that though the position detector 10A includes a circuit or the like for digitization (the A/D conversion circuit 4 and the CPU 5) in addition to the processing circuit 3 in the present example, the present invention is not limited to this example. The position detector 10A is not necessarily required to include the A/D conversion circuit 4 or the CPU 5, for example.

Principle of Position Detection

Referring to FIG. 5, each of the Hall effect devices 2 is a magnetoelectric transducer which utilizes Hall effect and operates as follows. First, a predetermined input voltage Vin is applied to the Hall effect device 2 to cause a current (charged particles) to flow through the Hall effect device 2. Subsequently, a magnetic field in a direction perpendicular to a direction of the current flow is applied to the Hall effect device, so that the charged particles in the magnetic field are shifted to one side of the Hall effect device 2 under influence of Lorenz force. As a result, the Hall effect device generates a potential difference Vh commensurate with a strength of the applied magnetic field or the like, and outputs the generated potential difference Vh (which will be hereinafter referred to as an "output voltage" or a "Hall-effect electromotive force"). Accordingly, the strength of the magnetic field (magnetism) can be appreciated from measurement of the Hall-effect electromotive force. Thus, the Hall effect device 2 functions as a magnetic sensor for measuring a strength of a magnetic field (magnetism). In the first preferred embodiment, the Hall effect device is employed as a position detection sensor (position detector), using the property that the strength of a magnetic field varies according to positional relationship between the magnet 1 and the pair of Hall effect devices 2a and 2b.

Figure 6:
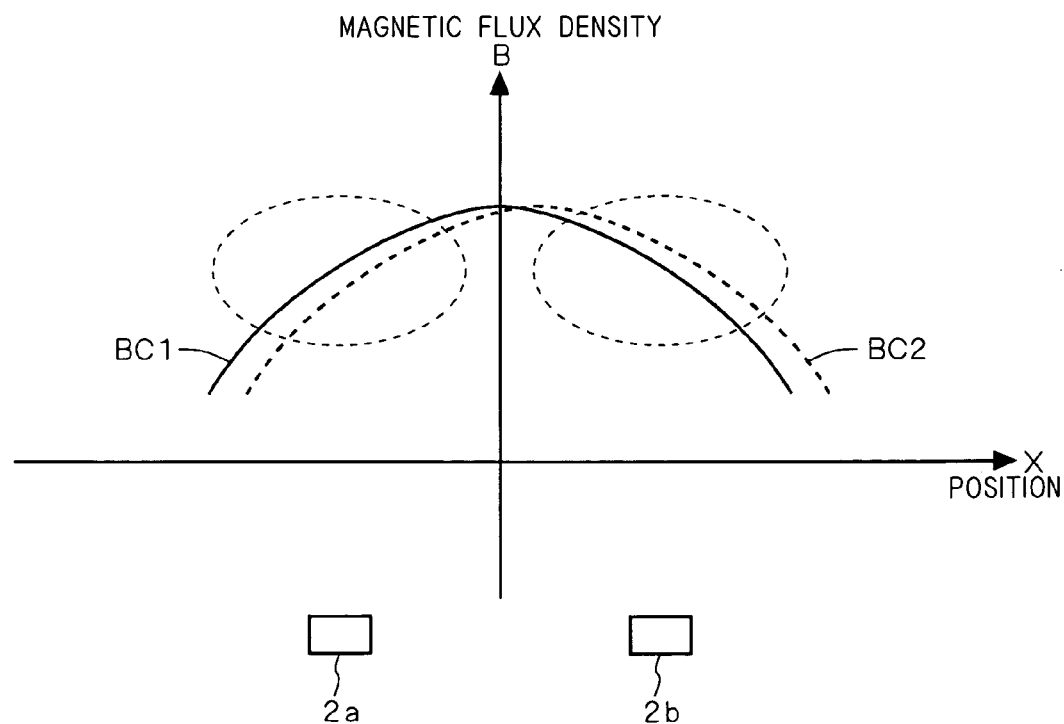
FIG. 6 shows a distribution of a magnetic flux density of a magnetic force generator.

FIG. 6 shows a distribution of a magnetic flux density of the magnetic force generator. Specifically, FIG. 6 shows a distribution curve BC1 of a magnetic flux density which is obtained when the magnet 1 is present in a reference position. It is noted that, in the present specification, a condition in which a center of the magnet 1 precisely corresponds to a center between the two Hall effect devices 2a and 2b is defined as a reference condition, and a position of the magnet 1 in the reference condition is defined as the reference position.

As shown in FIG. 6, each of the Hall effect devices (magnetic sensors) 2a and 2b detects a density of a magnetic flux produced just thereabove. After detection, the Hall effect devices (magnetic sensors) 2a and 2b output Hall-effect electromotive forces Vha and Vhb commensurate with the magnetic flux densities detected by the Hall effect devices 2a and 2b, respectively. When the magnet 1 moves from the reference position in a direction in which the X axis extends (a direction indicated by an arrow "X" in FIG. 6, which will be hereinafter referred to as a "+X direction"), the distribution of the magnetic flux density changes into a distribution indicated by a distribution curve BC2. Accordingly, the Hall-effect electromotive force Vha (more precisely, an absolute value thereof) of the Hall effect device 2a becomes smaller than that observed in the reference condition, while the Hall-effect electromotive force Vhb (more precisely, an absolute value thereof) of the other Hall effect device 2b becomes larger than that observed in the reference condition. In a situation converse to the above situation, i.e., when the magnet 1 moves from the reference position in a direction reverse to the +X direction (which will be hereinafter referred to as a "−X direction"), the Hall-effect electromotive force of the Hall effect device 2a becomes larger than that observed in the reference condition while the Hall-effect electromotive force of the Hall effect device 2b becomes smaller than that observed in the reference condition. It is additionally noted that though a sign (plus or minus) of the Hall-effect electromotive force may be reversed depending on a direction of a magnetic flux detection axis BD (an axis used for detecting a magnetic flux) of each of the Hall effect devices as appreciated from FIG. 5 showing the principle of position detection, it is assumed in the present example that the Hall effect devices 2a and 2b are disposed such that respective magnetic flux detection axes BD thereof are oriented in the same direction as illustrated in FIG. 3.

Then, a difference (a result of subtraction) between the respective Hall-effect electromotive forces Vha and Vhb of the Hall effect devices 2a and 2b is calculated as a value $\Delta V$ which is expressed by the following equation (1). The value $\Delta V$ is detected as a value representing a position X of the magnet 1 relative to the pair of Hall effect devices 2a and 2b.

$$\Delta V = Vha - Vhb \tag{1}$$

There is a one-to-one correspondence between the value $\Delta V$ and the position X. As long as the position X is within a predetermined range, a relatively excellent linearity exists between the position X and the value $\Delta V$. Hence, the position of the magnet 1 relative to the pair of Hall effect devices 2a and 2b can be satisfactorily detected.

Also, as shown in FIG. 6, whether the magnet 1 moves in the +X direction or in the −X direction, a sum of the Hall-effect electromotive forces Vha and Vhb is constant because increment of the Hall-effect electromotive force of one of the two Hall effect devices and decrement of the Hall-effect electromotive force of the other Hall effect device, which are caused by the movement of the magnet 1, are equal to each other.

Turning to FIG. 4, the processing circuit 3 includes differential amplifiers 31a and 31b, a subtractor 33, and a low pass filter 35.

The differential amplifier 31a functions to obtain the Hall-effect electromotive force Vha corresponding to a difference between potentials Va1 and Va2 outputted from the Hall effect device 2a, and the differential amplifier 31b functions to obtain the Hall-effect electromotive force Vhb corresponding to a difference between potentials Vb1 and Vb2 outputted from the Hall effect device 2b. Then, the subtractor 33 functions to calculate a difference between the Hall-effect electromotive forces Vha and Vhb (=Vha−Vhb) as the value $\Delta V$. An output of the subtractor 33 passes through the low pass filter 35, to be supplied as an output representing the position of the magnet 1 (position output).

In the meantime, even if an excellent linearity exists between the value $\Delta V$ and the position X, an inclination of a straight line representing the linearity may vary by a factor which will be described next. In other words, a sensitivity of the value $\Delta V$ to change in the position X may vary.

To allow for such a variation, the position detector 10A adjusts the input voltages applied to the two Hall effect devices (magnetic sensors) 2a and 2b so as to keep the sum (a result of addition) of the Hall-effect electromotive forces Vha and Vhb constant, in detecting the value (difference) $\Delta V$. In this manner, adjustment (sensitivity adjustment) which allows normalization of the difference $\Delta V$ can be achieved. The Hall-effect electromotive force has a property of varying according to not only a strength of a magnetic field but also a magnitude of an input voltage. Hence, the above-described adjustment of the input voltages corresponds to a sensitivity adjustment using the foregoing property of the Hall-effect electromotive force. Below, the adjustment of the input voltages will be described in detail.

Referring to FIG. 4, the processing circuit 3 includes an adder 34, a calculator 36, and a power supply controller 37. Each of the input voltages Vin applied to the Hall effect devices 2a and 2b is controlled using those elements 34, 36 and 37 such that a result of addition (sum) of the output voltages (Hall-effect electromotive forces) Vha and Vhb is constant.

More specifically, the adder 34 functions to obtain the sum of the output voltages Vha and Vhb (Vha+Vhb), and the calculator 36 calculates a difference between the sum and a predetermined value Vct (Vct −(Vha+Vhb)). The power supply controller 37 controls the input voltage Vin such that the sum (Vha+Vhb) is equal to the predetermined value Vct based on an output (Vct−(Vha+Vhb)) of the calculator 36. In particular, when the sum (Vha+Vhb) is larger than the predetermined value Vct, the power supply controller 37 reduces the input voltage Vin. On the other hand, when the sum (Vha+Vhb) is smaller than the predetermined value Vct, the power supply controller 37 increases the input voltage Vin. Thus the power supply controller 37 exercises feedback control in controlling the input voltage Vin such that the sum (Vha+Vhb) is equal to the predetermined value Vct.

As described above, the processing circuit 3 controls each of the input voltages Vin applied to the Hall effect devices 2a and 2b such that the sum of the output voltages (output values) of the Hall effect devices 2a and 2b (Vha+Vhb) is equal to the predetermined value Vct, and then detects and outputs the value ΔV which is equal to a difference between the output voltages (output values) of the Hall effect devices 2a and 2b, as the position output.

Compensation for error caused due to piece-to-piece variation of magnets

The above-described sensitivity adjustment makes it possible easily to suppress influences of piece-to-piece variation of magnets, and thereby achieve accurate position detection, which will be described in detail as follows.

First, when a given magnet with a number n is an object of position detection and is present in a predetermined position x, Hall-effect electromotive forces Vha(n) and Vhb(n) associated with the given magnet with the number n are expressed by the following equations (2) and (3), respectively. It is noted that though the Hall-effect electromotive force is a function of the position X as well as a function of the number n, emphasis is laid upon the fact that the Hall-effect electromotive force is a function of the number n with little regard to the fact that the Hall-effect electromotive force is a function of the position X, because attention should be directed to differences among individual magnets.

$$Vha(n)=Vin(n)\cdot\gamma(n)\cdot Va0 \quad (2)$$

$$Vhb(n)=Vin(n)\cdot\gamma(n)\cdot Vb0 \quad (3)$$

In the equation (2), Va0 represents an output value (a value of an output voltage) of the Hall effect device 2a per unit input voltage (an output value resulted from one-time application of an input voltage) in detecting a position of a standard magnet (reference magnet) which is present in the predetermined position x. In the equation (3), Vb0 represents an output value of the Hall effect device 2b per unit input voltage in detecting a position of the standard magnet which is present in the predetermined position x. Further, in the equations (2) and (3), Vin(n) represents the input voltage Vin which has been subjected to the above-described feedback control and is used in a position detector employing the magnet with the number n, and γ(n) represents a residual magnetic flux density coefficient of the magnet with the number n actually employed. The residual magnetic flux density coefficient is a ratio of a residual magnetic flux density of the magnet with the number n to a residual magnetic flux density of the standard (reference) magnet.

As mentioned above, the power supply controller 37 and the like exercise control for making the sum of the two Hall-effect electromotive forces (Vha+Vhb) equal to the predetermined value Vct. Accordingly, a relationship expressed by the following equation (4) is established between a sum of two Hall-effect electromotive forces found when a magnet with a number n=i is employed (Vha(i)+Vhb(i)) and a sum of two Hall-effect electromotive forces found when a magnet with a number n=j (Vha(j)+Vhb(j)) is employed.

$$Vha(i)+Vhb(i)=Vha(j)+Vhb(j) \quad (4)$$

Then, to substitute terms in right sides of the equations (2) and (3) in which "n" is set to "i" and "j", into the equation (4) and formulate the outcomes results in derivation of the following equation (5).

$$Vin(j)=Vin(i)\cdot\gamma(i)/\gamma(j) \quad (5)$$

Next, comparison between a value ΔV(i) which is a result of subtraction performed in a position detector employing the magnet with the number n=i and a value ΔV(j) which is a result of subtraction performed in a position detector employing the magnet with the number n=j is made. The values ΔV(i) and ΔV(j) are represented by the following equations (6) and (7) using the equations (2) and (3), respectively.

$$\begin{aligned}\Delta V(i) &= Vha(i) - Vhb(i) \\ &= Vin(i)\cdot\gamma(i)(Va0 - Vb0)\end{aligned} \quad (6)$$

$$\begin{aligned}\Delta V(j) &= Vha(j) - Vhb(j) \\ &= Vin(j)\cdot\gamma(j)(Va0 - Vb0)\end{aligned} \quad (7)$$

Then, to substitute a term in a right side of the equation (5) into the equation (7) as the value Vin(j), taking into account the equation (6), results in derivation of the following equation (8).

$$\begin{aligned}\Delta V(j) &= Vin(i)\cdot\frac{\gamma(i)}{\gamma(j)}\cdot\gamma(j)\cdot(Va0 - Vb0) \\ &= Vin(i)\cdot\gamma(i)\cdot(Va0 - Vb0) \\ &= \Delta V(i)\end{aligned} \quad (8)$$

From the equation (8), it is shown that the value ΔV(i), resulted from detection by the position detector employing the magnet with the number n=i, and the value ΔV(j), resulted from detection by the position detector employing the magnet with the number n=j, are equal to each other. This means that an error in detection which is caused due to piece-to-piece variation of magnets is compensated for.

As described above, by adjusting input values (values of input voltages) applied to the Hall effect devices so as to keep the sum of the Hall-effect electromotive forces constant, it is possible easily to compensate for piece-to-piece variation of magnets and thereby achieve accurate position detection. In particular, the above-described adjustment of input voltages significantly facilitates compensation for piece-to-piece variation of magnets in each apparatus as compared to a case where every adjustment parameter adapted to compensate for an individual difference of each magnet is previously obtained for each magnet.

Compensation for Error Caused Due To Temperature Change

The above-described adjustment also facilitates compensation for temperature change in a position detector. Details thereabout will be given as follows.

First, when the magnet 1 is present in the predetermined position x, Hall-effect electromotive forces Vha(T) and Vhb(T) generated at an ambient temperature T are expressed by the following equations (9) and (10), respectively. It is noted that though the Hall-effect electromotive force is a function of the position X, as well as a function of the temperature T, emphasis is laid upon the fact that the Hall-effect electromotive force is a function of the temperature T with little regard to the fact that the Hall-effect electromotive force is a function of the position X, because attention should be directed to change in the temperature T.

$$Vha(T) = Vin(T) \cdot \alpha(T) \cdot \beta(T) \cdot Va0 \qquad (9)$$

$$Vhb(T) = Vin(T) \cdot \alpha(T) \cdot \beta(T) \cdot Vb0 \qquad (10)$$

In the equation (9), Va0 represents an output value of the Hall effect device 2a per unit input voltage when the ambient temperature T is set to a standard temperature (reference temperature) T0 and the magnet 1 is present in the predetermined position x. In the equation (10), Vb0 represents an output value of the Hall effect device 2b per unit input voltage when the ambient temperature T is set to the standard temperature T0 and the magnet 1 is present in the predetermined position x. Vin(T) represents the input voltage Vin, which has been subjected to the above-described feedback control exercised at the ambient temperature T. Further, in the equations (9) and (10), α(T) represents a sensitivity coefficient of the Hall effect device at the ambient temperature T, i.e., a ratio of a sensitivity of the Hall effect device at the ambient temperature T to a sensitivity of the Hall effect device at the reference temperature T0. Moreover, β(T) represents a residual magnetic flux density coefficient of the magnet at the ambient temperature T, i.e., a ratio of a residual magnetic flux density of the magnet at the ambient temperature T to a residual magnetic flux density of the magnet at the reference temperature T0.

As mentioned above, the power supply controller 37 and the like exercise control for making the sum of the two Hall-effect electromotive forces (Vha+Vhb) equal to the predetermined value Vct. Accordingly, the following equation (11) is established.

$$Vha(T1) + Vhb(T1) = Vha(T2) + Vhb(T2) \qquad (11)$$

Then, to substitute terms in right sides of the equations (9) and (10), in which "T" is set to "T1" and "T2", into the equation (11) and formulate the outcomes results in derivation of the following equation (12).

$$Vin(T2) = Vin(T1) \cdot \frac{\alpha(T1) \cdot \beta(T1)}{\alpha(T2) \cdot \beta(T2)} \qquad (12)$$

Next, comparison between a value ΔV(T1), found at the ambient temperature T1, and a value ΔV(T2), found at the ambient temperature T2, is made. The values ΔV(T1) and ΔV(T2) are expressed by the following equations (13) and (14), respectively.

$$\Delta V(T1) = Vha(T1) - Vhb(T1) \qquad (13)$$
$$= Vin(T1) \cdot \alpha(T1) \cdot \beta(T1) \cdot (Va0 - Vb0)$$

$$\Delta V(T2) = Vha(T2) - Vhb(T2) \qquad (14)$$
$$= Vin(T2) \cdot \alpha(T2) \cdot \beta(T2) \cdot (Va0 - Vb0)$$

Then, to substitute a term in a right side of the equation (12) into the equation (14) as the value Vin(T2), taking into account the equation (13), results in derivation of the following equation (15).

$$\Delta V(T2) = Vin(T1) \cdot \frac{\alpha(T1) \cdot \beta(T1)}{\alpha(T2) \cdot \beta(T2)} \cdot \alpha(T2) \cdot \beta(T2) \cdot (Va0 - Vb0) \qquad (15)$$
$$= Vin(T1) \cdot \alpha(T1) \cdot \beta(T1) \cdot (Va0 - Vb0)$$
$$= \Delta V(T1)$$

From the equation (15), it is shown that the value ΔV(T1), resulted from detection at the ambient temperature T1, and the value ΔV(T2), resulted from detection at the ambient temperature T2, are equal to each other. This means that an error in detection which is caused due to temperature change is compensated for.

As described above, by adjusting input voltages applied to the Hall effect devices so as to keep the sum of the Hall-effect electromotive forces constant, it is possible easily to compensate for an error in position detection caused due to change in ambient temperature and thereby achieve accurate position detection. In particular, the above-described adjustment of input voltage significantly facilitates compensation for an error caused due to temperature change, as compared to a case where every adjustment parameter adapted to compensate for an error cause due to temperature change is previously obtained for each of typical ambient temperatures.

Compensation for Error Caused By Other Factors

The above-mentioned adjustment also makes it possible to compensate for an error caused by factors other than the above-cited factors (i.e., piece-to-piece variation of magnets and temperature change). Details thereabout will be given as follows.

First, when the magnet 1 is present in the predetermined position x, Hall-effect electromotive forces Vha(a, b, c, . . . ) and Vhb(a, b, c, . . . ) generated under influences of a plurality of factors (a, b, c, . . . ) each of which varies can be expressed by the following equations (16) and (17), respectively. It is noted that though the Hall-effect electromotive force is a function of the position X as well as a function of each of the factors (a, b, c, . . . ), emphasis is laid upon the fact that the Hall-effect electromotive force is a function of each of the factors (a, b, c, . . . ) with little regard to the fact that the Hall-effect electromotive force is a function of the position X, because attention should be directed to change of each of the factors (a, b, c, . . . ).

$$Vha(a, b, c, \ldots) = Vin(a, b, c, \ldots) \cdot K1(a) \cdot K2(b) \cdot K3(c) \cdot \cdots \cdot Va0 \qquad (16)$$

$$Vhb(a, b, c, \ldots) = Vin(a, b, c, \ldots) \cdot K1(a) \cdot K2(b) \cdot K3(c) \cdot \cdots \cdot Vb0 \qquad (17)$$

In the equation (16), Va0 represents an output value of the Hall effect device 2a per unit input voltage in a standard condition. In the equation (17), Vb0 represents an output value of the Hall effect device 2b per unit input voltage in the standard condition. Further, in the equations (16) and (17), Vin(a, b, c, . . . ) represents the input voltage Vin, which has been subjected to the above-described feedback control exercised when each of the factors changes to be no longer placed in the standard condition. Also, K1(a), K2(b), and K3(c) represent "change coefficients" (or "correction coefficients") of the factors (a, b, c, . . . ), which are indicative of respective changes of the factors with respect to the standard condition. It is noted that in the present specification, the standard condition means a condition in which all the factors (a, b, c, . . . ) have respective standard values (reference values). The "change coefficient" is a ratio of a value found in a condition after a change to the standard value.

For changes of the plurality of factors (a, b, c, . . . ) which can be compensated for, there are various kinds of changes which cause the two Hall-effect electromotive forces Vha and Vhb to correspondingly change at the same rate.

The various kinds of changes in the factors include, for example, positional shift of the magnet along a Y axis or a Z axis which is likely to occur during assembling one apparatus (position detector), and movement of the magnet along the Y axis or the Z axis which is likely to occur due to movement of the moving part. According to the first preferred embodiment, it is possible to compensate for variation among apparatuses caused due to foregoing changes in the factors, i.e., movement of the magnet along an axis perpendicular to a straight line between the Hall effect devices 2a and 2b (that is, along the Y or Z axis in FIG. 3).

Also, it is possible to compensate for variation caused due to degradation of the magnet (such as thermal demagnetization as a result of the magnet being held at a high temperature), and variation in magnet size. More specifically, even if the position detector is used at a high temperature (100° C., for example) so that the magnetic flux density of the magnet is decreased (in other words, the magnet is thermally demagnetized), degradation of the magnet due to the thermal demagnetization can be easily compensated for.

Further, assuming that the respective sensitivities of the pair of Hall effect devices 2a and 2b are identical to each other, variation in sensitivity of a sensor (formed of the pair of Hall effect devices 2a and 2b) among apparatuses, and an error caused due to change in a factor in the sensor such as aging, can be easily compensated for.

In other words, by exercising the above-described feedback control or the like, it is possible to compensate for variation caused by the plurality of factors which is expressed by the equations (16) and (17).

As mentioned above, the power supply controller 37 and the like exercise control for making the sum of the two Hall-effect electromotive forces (Vha+Vhb) equal to the predetermined value Vct. Accordingly, a relationship represented by the following equation (18) is established between a sum of two Hall-effect electromotive forces in a condition where the factors (a, b, c, . . . ) change into (a1, b1, c1, . . . ) (the sum is represented as Vha(a1, b1, c1, . . . )+Vhb(a1, b1, c1, . . . )) and a sum of two Hall-effect electromotive forces in a condition where the factors (a, b, c, . . . ) change into (a2, b2, c2, . . . ) (the sum is represented as Vha(a2, b2, c2, . . . )+Vhb(a2, b2, c2, . . . )).

$$Vha(a1, b1, c1, \ldots ) + Vhb(a1, b1, c1, \ldots ) = \qquad (18)$$
$$Vha(a2, b2, c2, \ldots ) + Vhb(a2, b2, c2, \ldots )$$

Then, to substitute terms in right sides of the equations (16) and (17) in which the factors (a, b, c, . . . ) are set to "(a1, b1, c1, . . . )" and "(a2, b2, c2, . . . )", into the equation (18) and formulate the outcomes results in derivation of the following equation (19).

$$Vin(a2, b2, c2, \ldots ) = Vin(a1, b1, c1, \ldots ) \cdot \frac{K1(a1) \cdot K2(b1) \cdot K3(c1)}{K1(a2) \cdot K2(b2) \cdot K3(c2)} \qquad (19)$$

Next, comparison between a value ΔV(a1, b1, c1, . . . ), which is a result of subtraction performed in the condition with the factors (a1, b1, c1, . . . ), and a value ΔV(a2, b2, c2, . . . ), which is a result of subtraction in the condition with the factors (a2, b2, c2, . . . ), is made. The values ΔV(a1, b1, c1, . . . ) and ΔV(a2, b2, c2, . . . ) are expressed by the following equations (20) and (21), respectively.

$$\Delta V(a1, b1, c1, \ldots ) = Vha(a1, b1, c1, \ldots ) - Vhb(a1, b1, c1, \ldots) = \qquad (20)$$
$$Vin(a1, b1, c1, \ldots ) \cdot K1(a1) \cdot K2(b1) \cdot K3(c1) \cdot (Va0 - Vb0)$$

$$\Delta V(a2, b2, c2, \ldots ) = Vha(a2, b2, c2, \ldots ) - Vhb(a2, b2, c2, \ldots ) = \qquad (21)$$
$$Vin(a2, b2, c2, \ldots ) \cdot K1(a2) \cdot K2(b2) \cdot K3(c2) \cdot (Va0 - Vb0)$$

Then, to substitute a term in a right side of the equation (19) into the equation (21) as the value Vin(a2, b2, c2, . . . ), taking into account the equation (20), results in derivation of the following equation (22).

$$\Delta V(a2, b2, c2, \ldots ) = \qquad (22)$$
$$Vin(a2, b2, c2, \ldots ) \cdot \frac{K1(a1) \cdot K2(b1) \cdot K3(c1)}{K1(a2) \cdot K2(b2) \cdot K3(c2)} \cdot K1(a2) \cdot$$
$$K2(b2) \cdot K3(c2) \cdot (Va0 - Vb0) = \Delta V(a1, b1, c1, \ldots )$$

From the equation (22), it is shown that the value ΔV(a1, b1, c1, . . . ) and the value ΔV(a2, b2, c2, . . . ) are equal to each other. This means that errors caused due to changes in the plurality of factors (a, b, c, . . . ) are compensated for.

As described above, by adjusting input voltages applied to the Hall effect devices so as to make the sum of the Hall-effect electromotive forces constant, it is possible easily to compensate for sensitivity variation (refer to the equations (16) and (17) each expressing a Hall-effect electromotive force implying sensitivity variation) which is caused by various factors, to thereby achieve accurate position detection. In particular, since there is no need of previously preparing every adjustment parameter for change in each factor in performing sensitivity adjustment, sensitivity adjustment can be more easily achieved. Thus, the above-described adjustment of input voltages significantly facilitates compensation for errors, as compared to a case where every adjustment parameter adapted to compensate for an error caused due to a change in each factor is previously obtained for each of typical values that the various factors would take. Moreover, the foregoing control concerning compensation for errors caused by various factors makes it possible easily to compensate for changes in various combinations of factors, and thus is of great convenience.

B. Second Preferred Embodiment

A second preferred embodiment of the present invention is a modification of the first preferred embodiment. In the second preferred embodiment, therefore, description will be given mainly about points of difference between the first and second preferred embodiments.

Figure 7:
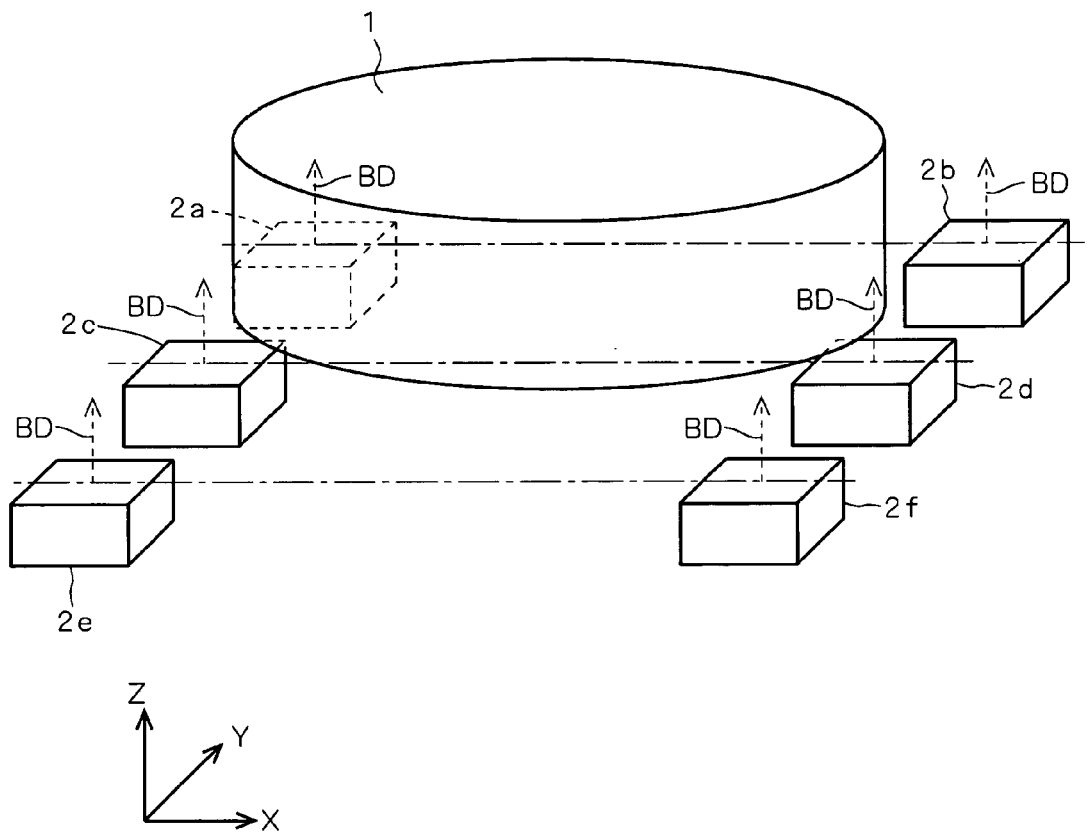
FIG. 7 is a perspective view of a position detector according to a second preferred embodiment.

FIG. 7 is a perspective view of a position detector 10B according to the second preferred embodiment. The position detector 10B allows more accurate one-dimensional detection of a position of the magnet on the X axis in a case where the magnet 1 moves along not only the X axis, but also the Y axis.

As illustrated in FIG. 7, the position detector 10B detects a position on the X axis using six Hall effect devices, or more precisely, three pairs of Hall effect devices (three magnetic-sensor pairs) (2a, 2b), (2c, 2d), and (2e, 2f). Two Hall effect devices in each of the pairs are spaced from each other along the X axis. The three pairs of Hall effect devices are arranged in parallel to one another. More specifically, the three pairs of Hall effect devices are arranged in parallel to one another with space along the Y axis between adjacent pairs. Further, respective device-to-device distances in the three pairs of the Hall effect devices are equal to one another, and therefore, the six Hall effect devices are arranged symmetrically with respect to a given line.

Moreover, a processing circuit similar to the processing circuit 3 described above is provided for each of the three pairs of Hall effect devices. By provision of those processing circuits, the value ΔV can be obtained from each of the pair of Hall effect devices (2a, 2b), the pair of Hall effect devices (2c, 2d), and the pair of Hall effect devices (2e, 2f). Each of the values ΔV obtained from the three pairs of Hall effect devices represents the position of the magnet 1 on the X axis.

Each of the Hall effect devices 2a, 2b, 2c, 2d, 2e, and 2f is disposed such that respective magnetic flux detection axes thereof are oriented in the same direction. As a result, in the pair of Hall effect devices (2c, 2d), as well as in the pair of Hall effect devices (2a, 2b), as a magnetic flux detected by one of the two Hall effect devices increases with movement of the magnet 1, a magnetic flux detected by the other decreases. Hence, a processing circuit similar to the processing circuit 3 can be employed for the Hall effect devices 2c and 2d. The foregoing matter can also be applied to the pair of Hall effect devices (2e, 2f).

The CPU 5, upon receipt of the three values ΔV, determines the position of the magnet 1 on the X axis relative to the Hall effect devices 2a and 2b based on the received three values ΔV. In other words, the CPU 5 detects a value corresponding to at least one of the three values ΔV, as the position output for a position on the X axis. More specifically, the CPU 5 can determine the position of the magnet 1 based on a mean value of the three values ΔV, for example. Alternatively, the CPU 5 can obtain a weighted average value of the three values ΔV and use the weighted average value as the position output. It is noted that a weighting coefficient used in obtaining the weighted average value is set to decrease the input voltage Vin increases. Further alternatively, the CPU 5 can select one of the three values ΔV which is outputted from one pair of Hall effect devices receiving the smallest input voltage Vin, out of the three pairs of the Hall effect devices. In the last alternative example, since a value measured by the most sensitive pair of Hall effect devices is employed, the position can be detected with high accuracy.

Additionally, movement of the magnet 1 along the Y axis does not cause change in the position output. This is because movement of the magnet 1 along the Y axis causes output values of the pairs of Hall effect devices to change at substantially the same rate.

It is possible to detect the position on the X axis by using only the pair of the Hall effect devices (2a, 2b). However, in a situation where the magnet 1 moves along not only the X axis but also the Y axis (the magnet 1 moves two-dimensionally), the magnet 1 may move to be located at a great distance from a straight line between the Hall effect devices 2a and 2b. In such situation, the accuracy in position detection is reduced because a magnetic field detected by the Hall effect devices reduces as the magnet 1 moves farther. To provide for such situation, according to the second preferred embodiment, a plurality of pairs of Hall effect devices are provided in parallel to one another along the Y axis. This can widen a detectable range of the position on the X axis, along an axis perpendicular to the X axis (i.e., along the Y axis).

C. Third Preferred Embodiment

A third preferred embodiment of the present invention will be described. A position detector 10C according to the third preferred embodiment allows two-dimensional detection of a position of the magnet 1 relative to the Hall effect devices 2. The third preferred embodiment is a modification of the first preferred embodiment. Therefore, in the third preferred embodiment, description will be given mainly about points of difference between the first and third preferred embodiments.

FIG. 8 is a perspective view of the position detector 10C according to the third preferred embodiment. As illustrated in FIG. 8, the position detector 10C includes four Hall effect devices, or more precisely, two pairs of Hall effect devices (two magnetic-sensor pairs) (2a, 2b) and (2c, 2d). More specifically, one of the two pairs of Hall effect devices (2a, 2b) is provided such that the Hall effect devices 2a and 2b are spaced from each other along the X axis, and the other pair (2c, 2d) is provided such that the Hall effect devices 2c and 2d are spaced from each other along the Y axis (perpendicular to the X axis).

Then, a sensor array which is formed of the Hall effect device 2a and 2b and extends along the X axis and a sensor array which is formed of the Hall effect devices 2c and 2d and extends along the Y axis intersect each other at right angles. Respective centers of the sensor arrays overlap each other, so that the sensor arrays are in the shape of a cross.

The magnet 1 is movable along the X axis, along which the Hall effect devices 2a and 2b are arranged (i.e., along the space between the devices 2a and 2b), and also movable along the Y axis, along which the Hall effect devices 2c and 2d are arranged (i.e., along the space between the devices 2c and 2d), in a plane parallel to a plane in which the pairs of Hall effect devices (2a, 2b) and (2c, 2d) are arranged.

Further, a processing circuit similar to the processing circuit 3 described above is provided for each of the two pairs of Hall effect devices. Each of the processing circuits controls input voltages applied to the corresponding pair of Hall effect devices in the same manner as in the first preferred embodiment, such that a sum of output values of the Hall effect devices in the corresponding pair is constant. More specifically, one of the processing circuits exercises feedback control in which each of the input voltages Vin applied to the Hall effect device 2a and 2b is controlled such that a sum of output values of the Hall effect devices 2a and 2b is constant. Likewise, the other processing circuit exercises feedback control in which each of the input voltages Vin applied to the Hall effect devices 2c and 2d is controlled such that a sum of output values of the Hall effect devices 2c and 2d is constant.

Moreover, each of the Hall effect devices 2a, 2b, 2c, and 2d is disposed such that respective magnetic flux detection axes thereof are oriented in the same direction. As a result, in the pair of Hall effect devices (2c, 2d), as well as in the pair of Hall effect devices (2a, 2b), as a magnetic flux detected by one of the two Hall effect devices increases with movement of the magnet 1, a magnetic flux detected by the other decreases. Hence, a processing circuit similar to the processing circuit 3 can be employed for the Hall effect devices 2c and 2d.

The processing circuits output the value ΔV supplied from the pair of Hall effect devices (2a, 2b) and the value ΔV supplied from the pair of Hall effect devices (2c, 2d). It is noted that the value ΔV supplied from the pair of Hall effect devices (2a, 2b) represents a position of the magnet 1 on the X axis, and will be also referred to as a "value ΔVx", and the value ΔV supplied from the pair of Hall effect devices (2c, 2d) represents a position of the magnet 1 on the Y axis, and also will be referred to as a "value ΔVy"

Output signals are inputted from the processing circuits to the CPU 5, and the CPU 5 obtains the values ΔVx and ΔVy, which are results of subtraction of respective output values of the two pairs of Hall effect devices, as position outputs for positions on the X axis and the Y axis. It is noted that each of the Hall effect devices provides an output value thereof under the above-described feedback control. More specifically, the CPU 5 numerically specifies the position x of the magnet 1 on the X axis based on the value ΔVx by referring to the correspondence between the value ΔVx and the position x on the X axis. Also, the CPU 5 numerically specifies a position y of the magnet 1 on the Y axis based on the value ΔVy by referring to the correspondence between the value ΔVy and the position y on the Y axis.

Additionally, in each of the pairs of Hall effect devices, movement of the magnet 1 along an axis perpendicular to the space between the Hall effect devices does not cause change in the position output. That is, each of the pairs of Hall effect devices accurately detects the position of the magnet on an axis along the space between the Hall effect devices even if the magnet moves along an axis at a given angle with the axis along the space. With the two pairs of Hall effect devices which intersect each other at right angles, it is possible to detect the positions of the magnet on axes along respective spaces between the Hall effect devices in one of the pairs and between the Hall effect devices in the other pair. Accordingly, two-dimensional position detection can be achieved by using a single magnet.

As described above, according to the third preferred embodiment, it is possible more easily to achieve accurate position detection while suppressing influences of piece-to-piece variation or the like in the same manner as in the first preferred embodiment, in achieving two-dimensional position detection with the X axis and the Y axis (x, y).

Also, the position detector 10C according to the third preferred embodiment, in which the two pairs of Hall effect devices are disposed to extend along different axes, allows detection of positions on two axes distinct from each other. In particular, since the axes along which the two pairs of the Hall effect devices extend, respectively, (i.e., the axes along the respective spaces in the two pairs) are perpendicular to each other, two-dimensional position detection can be more easily achieved. Additionally, though it has been described hereinabove that the respective spaces of the two pairs of Hall effect devices are perpendicular to each other by way of example, the angle between the two pairs of the Hall effect devices is not limited to right angles. The two pairs of Hall effect devices may be arranged such that respective straight lines between the Hall effect devices in one of the two pairs and between the Hall effect devices in the other pair intersect at an arbitrary angle to each other.

Moreover, the four Hall effect devices 2a, 2b, 2c and 2d forming the two pairs of Hall effect devices are arranged symmetrically with respect to a given point in the third preferred embodiment. As a result, occurrence of an error in measurement due to anisotropy can be suppressed.

It is additionally noted that though the magnet 1 is cylindrical in the third preferred embodiment and the like described above, the shape of the magnet 1 is not limited to a cylindrical shape in the present invention. For example, the magnet 1 alternatively may be in the shape of a rectangular parallelepiped, for example. However, it is preferable that the magnet 1 is cylindrical. This is because a cylindrical magnet shows a distribution of a magnetic flux density which is in a concentric pattern about a central axis of the cylindrical shape of the magnet 1, so that symmetry of the distribution of magnetic flux density can be ensured, resulting in more accurate position detection.

D. Fourth Preferred Embodiment

A fourth preferred embodiment of the present invention will be described. A position detector 10D according to the fourth preferred embodiment allows three-dimensional detection of a position of the magnet 1 relative to the Hall effect devices 2. The fourth preferred embodiment is a modification of the first, second and third preferred embodiments. In the fourth preferred embodiment, therefore, description will be given mainly about points of difference between the third and fourth preferred embodiments.

Figure 9:
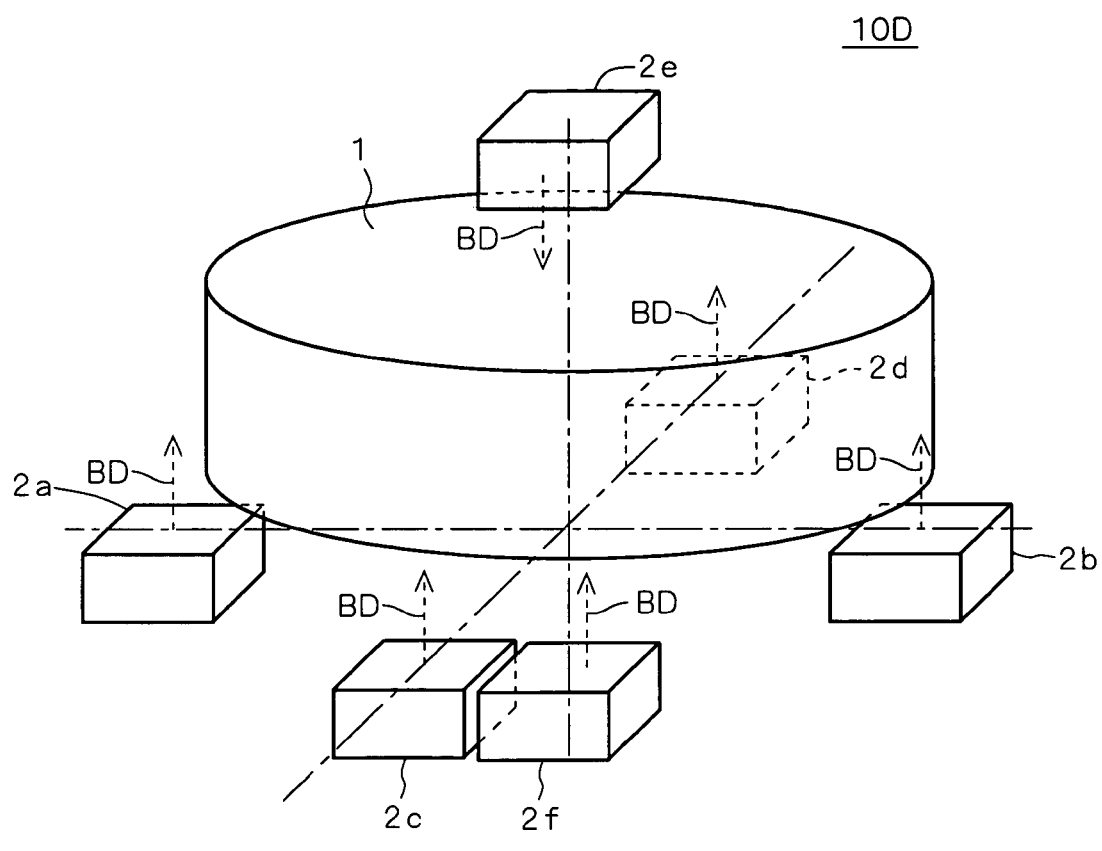
FIG. 9 is a perspective view of a position detector according to a fourth preferred embodiment.

FIG. 9 is a perspective view of the position detector 10D according to the fourth preferred embodiment. As illustrated in FIG. 9, the position detector 10D includes six Hall effect devices, or more precisely, three pairs of Hall effect devices (magnetic-sensor pairs) (2a, 2b), (2c, 2d) and (2e, 2f). More specifically, the two pairs of Hall effect devices (2a, 2b) and (2c, 2d) are arranged to extend along the X axis and the Y axis, respectively, in the same manner as in the third preferred embodiment, and a further pair of Hall effect devices (2e, 2f) is provided such that the Hall effect devices 2e and 2f are spaced from each other along the Z axis (perpendicular to both the X axis and the Y axis).

Further, a processing circuit similar to the processing circuit 3 described above is provided for each of the three pairs of Hall effect devices. The processing circuits control input voltages (input values) applied to the three pairs of Hall effect devices in the same manner as in the first preferred embodiment, such that a sum of output values of the Hall effect devices in each pair is constant. More specifically, one of the processing circuits exercises feedback control in which each of the input voltages Vin applied to the Hall effect device 2a and 2b is controlled such that a sum of output values of the Hall effect devices 2a and 2b is constant. Likewise, another processing circuit exercises feedback control in which each of the input voltages Vin applied to the Hall effect devices 2c and 2d is controlled such that a sum of output values of the Hall effect devices 2c and 2d is constant. Further likewise, another different processing circuit exercises feedback control in which each of the input voltages Vin applied to the Hall effect devices 2e and 2f is controlled such that a sum of output values of the Hall effect devices 2e and 2f is constant.

Here, each of the Hall effect devices 2a, 2b, 2c, and 2d is disposed such that respective magnetic flux detection axes thereof are oriented in the same direction. On the other hand, each of the Hall effect devices 2e and 2f is disposed such that respective magnetic flux detection axes thereof are oriented in opposite directions. As a result, in the pair of Hall effect devices (2e, 2f), as well as in the pairs of Hall effect devices (2a, 2b) and (2c, 2d), as a magnetic flux detected by one of the two Hall effect devices increases with movement of the magnet 1, a magnetic flux detected by the other decreases. Hence, a processing circuit similar to the processing circuit 3 can be employed for the Hall effect devices 2e and 2f.

The processing circuits output the value ΔV (or the value ΔVx) supplied from the pair of Hall effect devices (2a, 2b), the value ΔV (or the value ΔVy) supplied from the pair of Hall effect devices (2c, 2d), and the value ΔV supplied from the pair of Hall effect devices (2e, 2f). It is noted that the value ΔV supplied from the pair of Hall effect devices (2e, 2f) represents a position of the magnet 1 on the Z axis, and will be also referred to as a "value ΔVz".

Output signals from the processing circuits are inputted to the CPU 5, and the CPU 5 obtains the values ΔVx, ΔVy, and ΔVz which are results of subtraction of the respective output values of the three pairs of Hall effect devices, as position outputs for positions on the X axis, the Y axis, and the Z axis. It is noted that each of the Hall effect devices provides an output value thereof under the above-described feedback control. The position outputs (x, y) for positions on the X axis and the Y axis are obtained in the above-described manner, for example. For the position output for a position on the Z axis, the CPU 5 converts the value ΔVz into a numerical value indicative of a position z based on the value ΔVz by referring to the correspondence between the value ΔVz and the position z on the Z axis.

As described above, the position detector 10D according to the fourth preferred embodiment makes it possible more to easily achieve accurate position detection while suppressing influences of piece-to-piece variation or the like in the same manner as in the first preferred embodiment, in achieving three-dimensional position detection with the X axis, the Y axis, and the Z axis (x, y, z).

Also, the position detector 10D according to the fourth preferred embodiment, in which the three pairs of Hall effect devices are disposed to extend along different axes, allows detection of positions on three axes distinct from one another. In particular, since the axes along which the three pairs of the Hall effect devices extend, respectively, (i.e., the axes along the respective spaces in the three pairs) are perpendicular to one another, three-dimensional position detection more easily can be achieved.

Additionally, it has been described above that the Hall effect devices 2e and 2f are disposed such that the respective magnetic flux detection axes BD are oriented in opposite directions, and the same processing circuit as is provided for the Hall effect devices 2a and 2b is provided for the Hall effect devices 2e and 2f, by way of example. However, the present invention is not limited to such example. For example, the Hall effect devices 2e and 2f may alternatively be disposed such that the respective magnetic flux detection axes are oriented in the same direction. This alternative example can be accomplished by employing any of processing circuits 3B, 3C and 3D (FIGS. 10, 11 and 12, for example) for the Hall effect devices 2e and 2f, instead of the same processing circuit provided for the Hall effect devices 2a and 2b.

In the processing circuit 3B, an inverting amplifier 31c inverts an output provided from the differential amplifier 31b as illustrated in FIG. 10. In the processing circuit 3C, an input to the differential amplifier 31b is inverted prior to being provided to the differential amplifier 31b, as illustrated in FIG. 11.

Further, in the processing circuit 3D illustrated in FIG. 12, input values (the input voltages Vin, for example) applied to the Hall effect devices 2e and 2f are controlled such that a difference (result of subtraction) between output values of the two Hall effect devices 2e and 2f, which is calculated by a subtractor 38, is constant. Then, a sum (result of addition) of the output values of the two Hall effect devices 2e and 2f, which is calculated by an adder 39, is detected as the position output. In this case, the value calculated by the subtractor 38 corresponds to the sum of magnitudes of the output values of the Hall effect devices 2e and 2f, and the value calculated by the adder 39 corresponds to a difference between magnitudes of the output values of the Hall effect devices 2e and 2f. Accordingly, a difference in magnitude between the output values of the Hall effect devices 2e and 2f can be obtained as the position output with the input values applied to the Hall effect devices 2e and 2f having been controlled such that a sum of the magnitudes (absolute value) of the output values of the Hall effect devices 2e and 2f is constant, similarly to the foregoing operation.

E. Fifth Preferred Embodiment

In a fifth preferred embodiment of the present invention, a specific example of application of a position detector will be described. Below, an example in which one of the above-described position detectors is applied to a camera-shake compensation mechanism of an image capture apparatus will be described. It is noted that the present invention is applicable to both an image capture apparatus of a type that captures a still image (such as a digital still camera) and an image capture apparatus of another type that captures a moving image (such as a digital movie camera).

FIG. 13 illustrates an image capture apparatus 300A (a digital still camera in this example) which also functions to compensate for camera shake. The image capture apparatus 300A includes a camera body 60, a lens barrel 70 in which a plurality of lenses 40 are mounted, a gyro sensor 50 secured to a side face of the lens barrel 70, and a camera-shake compensation apparatus 100 attached to an end face of the lens barrel 70.

In the camera-shake compensation apparatus 100, an imaging device 16 such as a CCD is provided. The camera-shake compensation apparatus 100 moves the imaging device 16 in an X-Y plane perpendicular to an optical axis L in response to shake of the image capture apparatus 300A, which is detected by the gyro sensor 50, to compensate for camera shake. For example, consider a situation where the image capture apparatus 300A shakes as indicated by a two-headed arrow D1 in FIG. 13 in photographing using the image capture apparatus 300A, so that the optical axis L of light incident upon the lens barrel 70 deviates. In such situation, the camera-shake compensation apparatus 100 moves the imaging device 16 as indicated by a two-headed arrow D2 in FIG. 13, thereby to compensate for the deviation of the optical axis L. The camera-shake compensation apparatus 100 incorporates a position detection function of a position detector, and is configured to detect a current position of the imaging device 16 in the X-Y plane by performing the position detection function in compensating for camera shake, and to use information about the current position of the imaging device 16 as feedback information for controlling the position of the imaging device 16 with high accuracy.

Figure 14:
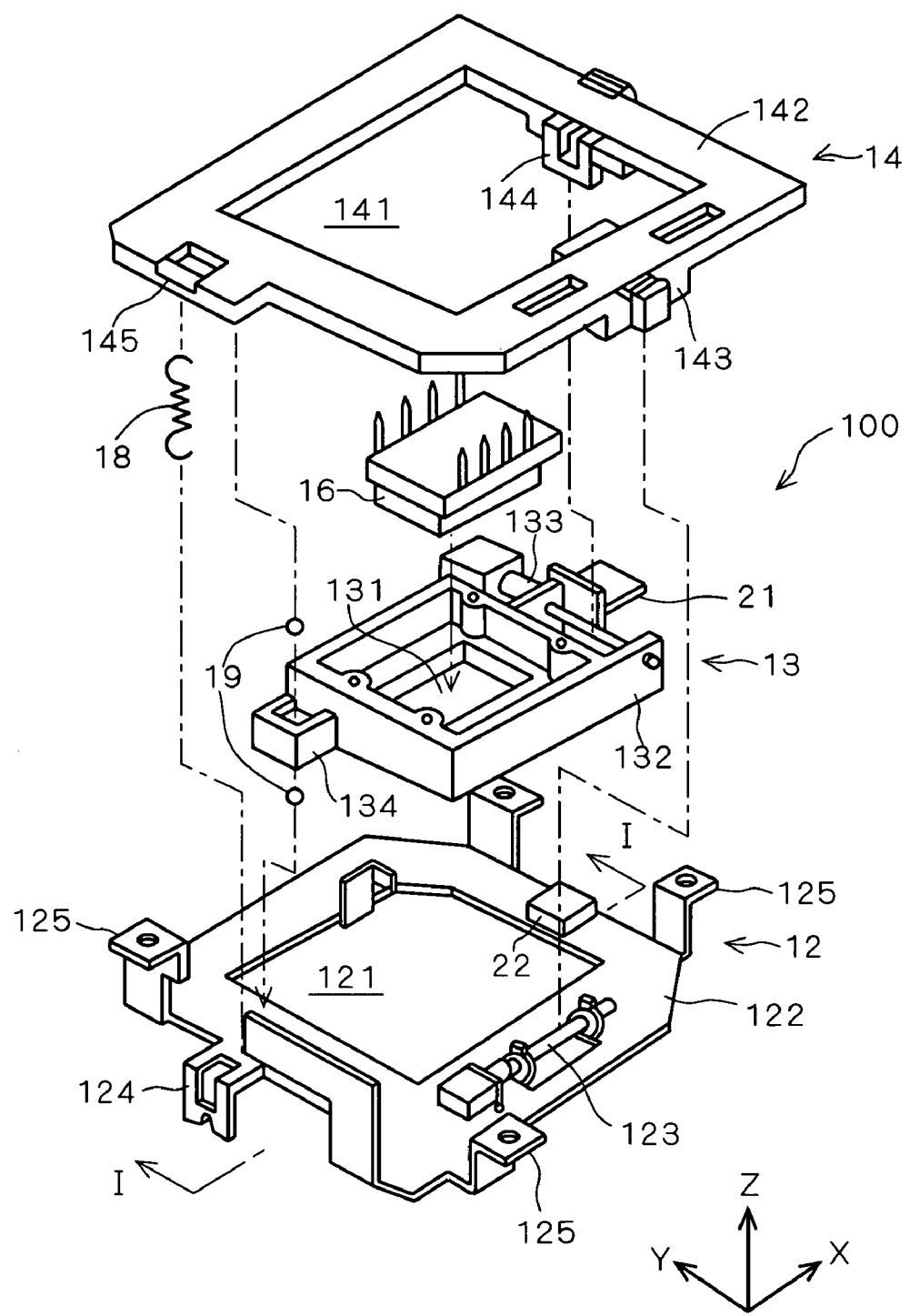
FIG. 14 is an exploded perspective view of a camera-shake compensation apparatus.

FIG. 14 is an exploded perspective view of the camera-shake compensation apparatus 100. As illustrated in FIG. 14, the camera-shake compensation apparatus 100 includes an assemblage formed of: a base plate 12 secured to the end face of the lens barrel 70; a first slider 14 which is movable relative to the base plate 12 along an X axis; and a second slider 13 which is movable relative to the first slider 14 along a Y axis, as principal parts.

The base plate 12 includes a metal frame 122, which is annular by inclusion of an opening 121 at a center thereof, as a base material. The metal frame 122 is secured to the lens barrel 70. The base plate 12 further includes a first actuator 123 extending along the X axis and a magnetic sensor unit 22 including a plurality of Hall effect devices. The first actuator 123 and the magnetic sensor unit 22 are provided on the metal frame 122. Further, a first spring hanger 124 is provided in a predetermined position in an outer edge of the metal frame 122, and L-shaped substrate supports 125 are provided in respective positions in the outer edge of the metal frame 122.

The second slider 13 includes a frame 132 which is made of resin and includes an opening 131 at a center thereof. The imaging device 16 can be fit in the opening 131 of the frame 132 and secured to the frame 132. The second slider 13 further includes a second actuator 133 extending along the Y axis, a hard sphere pocket 134 in which hard spheres 19 are fit with clearance while being located on opposite faces of the pocket 134 along a Z axis, and a magnet support 21 for supporting a magnet. The second actuator 133, the hard sphere pocket 134 and the magnet support 21 are provided on the frame 132. The magnet support 21 is situated outwardly from the second actuator 133 relative to the opening. 131, so as to face the magnetic sensor unit 22 provided in the base plate 12.

Figure 15:
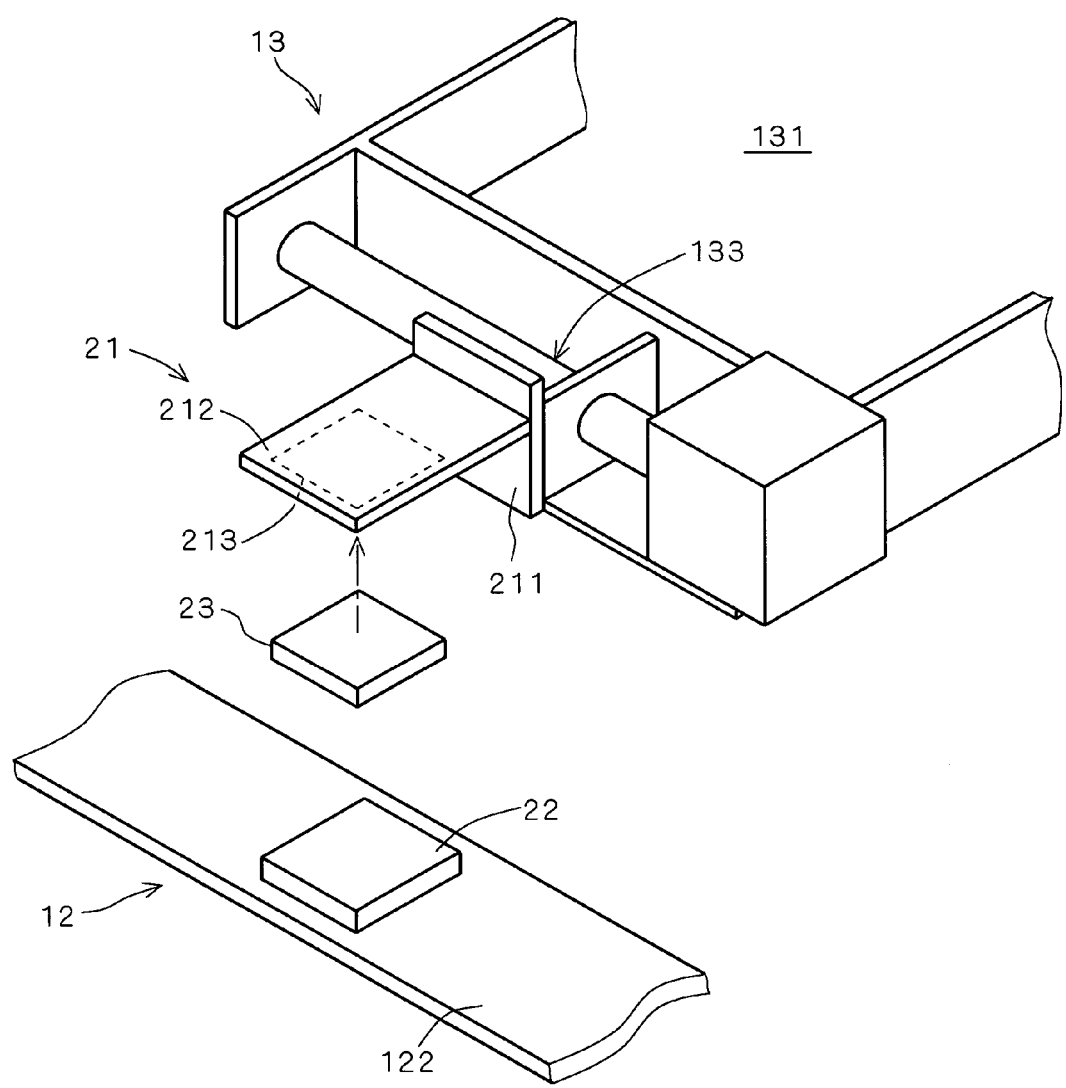
FIG. 15 is a magnified view of principal parts of a magnet support when viewed from the front.

FIG. 15 is a magnified view of the magnet support 21 which illustrates principal parts of the magnet support 21 when viewed from the front. As illustrated in FIG. 15, the magnet support 21 includes a plate-shaped magnet supporting arm 212 which extends outwardly from a wall 211 situated outwardly from the second actuator 133. The magnet supporting arm 212 includes a magnet receiver 213 at a lower face of an edge portion thereof. The magnet receiver 213 is configured such that a magnet 23 can be fit in and secured to the magnet receiver 213. The magnet 23, secured to the lower face of the magnet supporting arm 212, is situated so as to face the magnetic sensor unit 22 in the base plate 12 as illustrated in FIG. 15. Also, the magnet 23 and the magnetic sensor unit 22 are disposed such that a lower face of the magnet 23 and an upper face of the magnetic sensor unit 22 are substantially parallel to each other.

Referring back to FIG. 14, the first slider 14 includes an annular frame 142 which is made of aluminum and includes an opening 141 at a center thereof, as a base material. The second slider 13 is fit in the opening 141 of the annular frame 142. The first slider 14 further includes a first friction-engagement part 143, a second friction-engagement part 144, and a second spring hanger 145 which are provided in the annular frame 142. The first friction-engagement part 143 is situated so as to face the first actuator 123 of the base plate 12, and the second friction-engagement part 144 is situated so as to face the second actuator 133 of the second slider 13. Further, the second spring hanger 145 is situated so as to face the first spring hanger 124 of the base plate 12.

Figure 16:
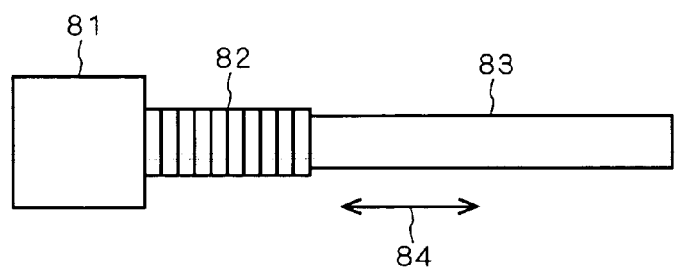
FIG. 16 illustrates a structure of an impact actuator.

Each of the first actuator 123 and the second actuator 133 includes a static part 81, a piezoelectric element 82 and a drive rod 83 as illustrated in FIG. 16. The static part 81 is secured to the base plate 12 or the second slider 13. The piezoelectric element 82 includes one end secured to the static part 81 and the other end connected to the drive rod 83. Those components of each of the first and second actuators 123 and 133 are configured such that the drive rod 83 moves a given distance in a given direction in accordance with drive pulses applied to the piezoelectric element 82. In this regard, the drive rod 83 moves along a length of each of the first and second actuators 123 and 133, that is, in directions indicated by a two-headed arrow 84 in an example illustrated in FIG. 16.

When the above-described camera-shake compensation apparatus 100 is assembled, the imaging device 16 is fit in the opening 131 of the second slider 13 to be secured to the second slider 13. Also, the drive rod 83 of the first actuator 123 is frictionally engaged with the first friction-engagement part 143, and the drive rod 83 of the second actuator 133 is frictionally engaged with the second friction-engagement part 144. Further, a spring 18 is stretched between the first spring hanger 124 and the second spring hanger 145, so the base plate 12 and the first slider 14 are urged in respective directions which bring the base plate 12 and the first slider 14 close to each other. At that time, the second slider 13 is sandwiched between the base plate 12 and the first slider 14 with the hard spheres 19 interposed. Consequently, the base plate 12, the second slider 13 and the first slider 14 are arranged in a direction in which the Z axis extends (which is indicated by an arrow in FIG. 2 and will be hereinafter referred to as a "positive Z-axis direction") in the order of occurrence in this sentence, with the second slider 13 being overlaid on the base plate 12 and the first slider 14 being overlaid on the second slider 13.

In the camera-shake compensation apparatus 100 as assembled in the foregoing manner, movement of the drive rod 83 of the first actuator 123 is followed by movement of the first friction-engagement part 143 frictionally engaged with the drive rod 83 of the first actuator 123, which involves movement of the first slider 14 relative to the base plate 12 along the X axis. Further, the second slider 13 moves relative to the base plate 12 along the X axis in unison with the first slider 14. On the other hand, movement of the drive rod 83 of the second actuator 133 is followed by movement of the second friction-engagement part 144 frictionally engaged with the drive rod 83 of the second actuator 133, which involves movement of the second slider 13 relative to the first slider 14 along the Y axis. At that time, the first slider 14 does not move relative to the base plate 12, and thus, the second slider 13 alone moves relative to the base plate 12 along the Y axis.

As is made clear from the above description, each of the first slider 14 and the second slider 13 serves as a moving part which is capable of moving relative to the base plate 12 serving as a fixed part, while holding the imaging device 16, in the camera-shake compensation apparatus 100. The first slider 14 simply moves relative to the base plate 12 linearly along the X axis. In contrast thereto, the second slider 13 not only moves along the X axis in unison with the first slider 14, but also is capable of independently moving along the Y axis. The second slider 13 is configured to be capable of moving in the X-Y plane perpendicular to the optical axis while holding the imaging device 16.

It is noted that the respective drive rods 83 of the first actuator 123 and the second actuator 133 also function as guide parts for guiding the second slider 13 linearly along the X axis and the Y axis, respectively.

Figure 17:
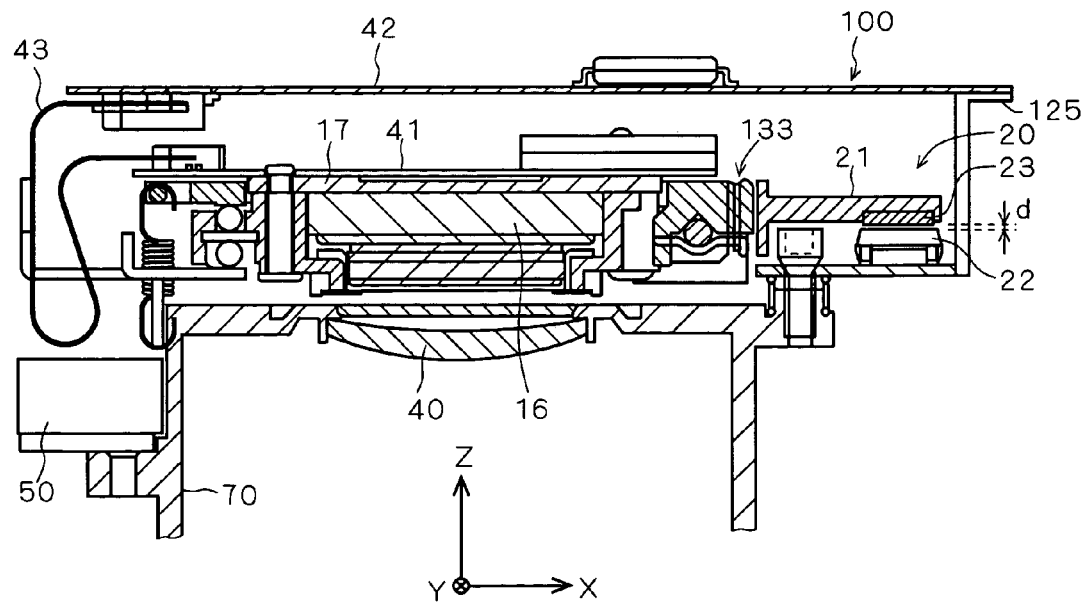
FIG. 17 is a sectional view taken along a line I—I in FIG. 14.

FIG. 17 is a sectional view taken along a line I—I in FIG. 14. FIG. 17 illustrates a state in which the camera-shake compensation apparatus 100 is assembled and attached to the lens barrel 70. In the camera-shake compensation apparatus 100, the magnetic sensor unit 22 provided in the base plate 12 and the magnet 23 attached to the second slider 13 are held to face each other in close proximity to each other. The magnetic sensor unit 22 is situated so as to be capable of satisfactorily detecting change in a magnetic field generated by the magnet 23. The second slider 13 is capable of moving in the X-Y plane as described above, and a position of the magnet 23 relative to the magnetic sensor unit 22 varies as the second slider 13 moves. Movement of the magnet 23 relative to the magnetic sensor unit 22 in the X-Y plane results in change of a magnetic field detected by the magnetic sensor unit 22. Hence, the magnetic sensor unit 22 detects a magnetic field which changes as the second slider 13 moves. Accordingly, it is possible to detect where the second slider 13 has moved or is moving to (i.e., a current position of the second slider 12), via detection of change in a magnetic field generated by the magnet 23 which is performed by the magnetic sensor unit 22. Thus, the magnetic sensor unit 22 and the magnet 23 form a position detection mechanism 20 for detecting a position of the second slider 13 relative to the base plate 12. Since the magnet 23 does not require electric wiring, the position detection mechanism 20 employing the magnet 23 would produce the advantage of significantly saving labor associated with the installation of wiring.

Further, a first substrate 41 is provided on a back face (one of opposite faces which is situated in the positive Z-axis direction relative to the other face) of the imaging device 16 fit in the second slider 13, with a heat dissipation plate 17 being interposed therebetween. The imaging device 16 is connected to the first substrate 41. Accordingly, the first substrate 41 moves along the X axis and the Y axis in unison with the second slider 13. Also, the second substrate 42 is secured to the substrate supports 125 of the base plate 12. The first substrate 41 and the second substrate 42 are arranged along the optical axis (along the Z axis) while being overlaid upon each other. The first substrate 41 moves in parallel to the second substrate 42 as the second slider 13 moves. The first substrate 41 and the second substrate 42 are connected to each other by a flexible substrate 43, and configured to allow transmission and reception of a signal therebetween.

The magnetic sensor unit 22 is connected to the second substrate 42 by a signal line not illustrated. Also, the gyro sensor 50, which detects shake of the image capture apparatus 300A and outputs a signal indicative of an angular rate (angular rate signal) of shake along the X axis and the Y axis, is connected to the second substrate 42 by a signal line not illustrated.

The first substrate 41 is provided with an element, or a circuit, for controlling the imaging device 16. An output signal (image signal) of the imaging device 16 is supplied to the second substrate 42 via the flexible substrate 43. The second substrate 42 is provided with a circuit for processing the output signal of the imaging device 16, a circuit for processing a signal supplied from the magnetic sensor unit 22 which detects a position of the second slider 13, or the like. The second substrate 42 is further provided with a control circuit (a circuit including a microcomputer or the like) for controlling drive of the first and second actuators 123 and 133, based on a signal indicative of a position (values of coordinate X and Y) received from an output circuit and the angular rate signal received from the gyro sensor 50. Then, the second substrate 42 outputs the image signal captured in the imaging device 16 to a control circuit, which is provided within the image capture apparatus 300A but not included in the camera-shake compensation apparatus 100, and sends a drive signal (drive pulses) to each of the first and second actuators 123 and 133 connected to the second substrate 42 by a signal line not illustrated.

In arranging circuits in the foregoing manner, the magnet 23 provided in the second slider 13 does not require electric wiring, so wiring pattern for each of the first substrate 41 and the second substrate 42 can be made relatively easily. This increases the flexibility in arrangement of components or wire routing during a designing process, and improves efficiency in assembly. In particular, since installation of wiring in a moving part results in creation of a resistance to movement of the moving part in some cases, it is desired to avoid installation of wiring in the moving part if possible. According to the fifth preferred embodiment, desirable arrangement is achieved, in which the magnet 23 is provided in the second slider 13 serving as a moving part so that the movement of the second slider 13 is not obstructed by wiring in the position detection mechanism 20.

Figure 18:
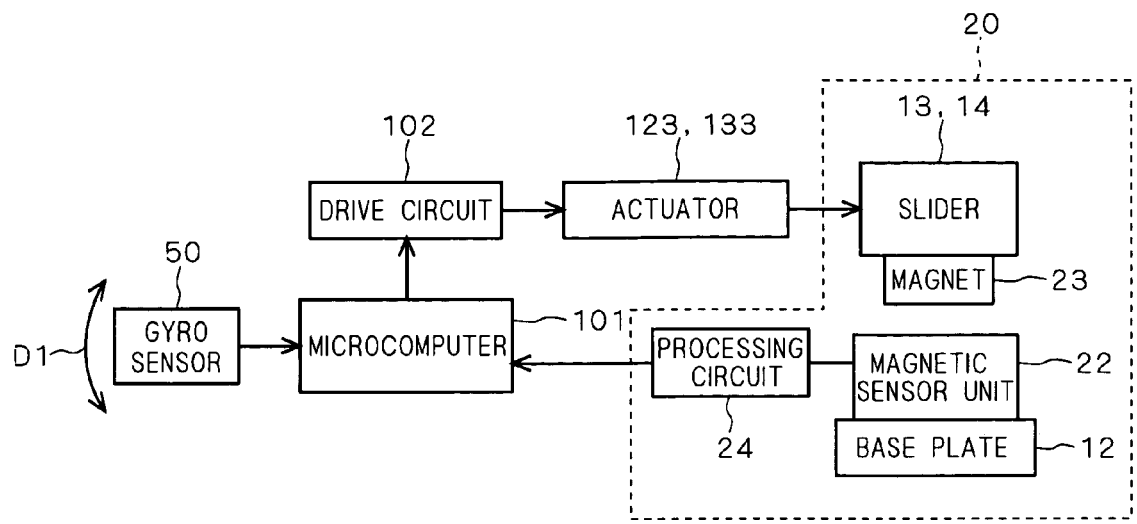
FIG. 18 is a block diagram showing electrical connections in a drive control circuit of the camera-shake compensation apparatus.

Next, operations of the above-described camera-shake compensation apparatus 100 will be described. FIG. 18 is a block diagram illustrating electrical connection in a drive control circuit of the camera-shake compensation apparatus 100 according to the fifth preferred embodiment. The drive control circuit includes: the gyro sensor 50 for detecting deviation of the optical axis L of light incident upon the lens barrel 70 and outputting an angular rate signal; a processing circuit 24 for processing a signal received from the magnetic sensor unit 22 which detects a position of the second slider 13 (or the imaging device 16); a microcomputer 101 for exercising comprehensive control for compensation for camera shake and calculating an amount to drive the sliders 13 and 14 based on various signals inputted to the microcomputer 101; and a drive circuit 102 for generating drive pulses at a predetermined frequency based on a drive signal supplied from the microcomputer 101. The drive pulses generated by the drive circuit 102 are outputted to the first and second actuators 123 and 133, upon application of which the first and second sliders 14 and 13 moves along the lengths of the first and second actuators.

The gyro sensor 50 detects an angular rate of movement along the two axes (along the X axis and the Y axis) and outputs a signal indicative of the detected angular rate (angular rate signal) to the microcomputer 101, in response to shake of the camera body 60 indicated by the arrow D1 in FIG. 18.

The microcomputer 101, upon receipt of the angular rate signal from the gyro sensor 50, calculates an amount and a speed of shift of an image on the imaging device 16 (in particular, on an image forming face), which occurs due to image blur, based on a signal indicative of a focal length of an optical system. Subsequently, the microcomputer 101 determines a supply voltage which should be applied to the first and second actuators 123 and 133 at a predetermined frequency, based on the calculated speed of shift and a current position of the second slider 13 (or the imaging device 16). To this end, the microcomputer 101 compares a position (current position) where the second slider 13 (or the imaging device 16) is actually situated, with a position (target position) where the imaging device 16 is supposed to be situated under normal conditions. The current position of the second slider 13 (or the imaging device 16) is obtained based on a signal received from the magnetic sensor unit 22, and the target position is determined based on the angular rate signal received from the gyro sensor 50. Then, the microcomputer 101 exercises feedback control for driving the sliders 13 and 14 so that the imaging device 16 can move to the target position.

The drive circuit 102 receives the drive signal from the microcomputer 101, and outputs drive pulses at a frequency which is about seven-tenths of a resonance frequency of the actuators 123 and 133. The drive pulses are applied to the piezoelectric element 82, to cause each of the first and second sliders 14 and 13 to move along the drive rod 83. More specifically, the drive pulses applied to the piezoelectric element 82 has a sawtooth waveform including a slow rise and a sharp fall. Application of the drive pulses to the piezoelectric element 82 can cause the part 13 (or 14) frictionally engaged with the drive rod 83 to move in a given direction by virtue of interaction between a friction force and an inertial force which depends on difference in magnitude therebetween. Conversely, application of drive pulses having another sawtooth waveform which includes a sharp rise and a slow fall, to the piezoelectric element 82, allows the part 13 (or 14) to move in a direction reverse to the given direction.

As is made clear from the foregoing, each of the first and second actuators 123 and 133 functions as an impact actuator, by which the slider 13 or 14 frictionally engaged with the drive rod 83 is caused to slide on the drive rod 83 as the piezoelectric element 82 gets longer or shorter. Application of the drive pulses to the first actuator 123 results in movement of the first slider 14 along the X axis, which is followed by the movement of the second slider 13 joined to the first slider 14 along the X axis. On the other hand, when the drive pulses are applied to the second actuator 133, the second slider 13 alone moves (free-running) along the Y axis, independently of the first slider 14. During the movement of the second slider 13 along the Y axis, the second slider 13 neither meets with a considerable resistance nor moves along the optical axis by virtue of the provision of the spring 18 stretched between the first slider 14 and the base plate 12 and the hard spheres 19 among the first and second sliders 14 and 13 and the base plate 12. Further, during the movement of the second slider 13 along the Y axis, a bent portion of the flexible substrate 43 connecting the first substrate 41 and the second substrate 42 is deformed to absorb the movement of the second slider 13.

As described above, the camera-shake compensation apparatus 100 incorporates a position detection function supposed to be performed by a position detector. The position detection function is achieved by the position detection mechanism 20 including the magnetic sensor unit 22 and the magnet 23, which constitutes one of the structural features of the camera-shake compensation apparatus 100. According to the fifth preferred embodiment, the position detection mechanism 20 which eliminates the need of installation of wiring for position detection in at least one of a moving part and a fixed part is implemented.

In the meantime, the respective components of the position detection mechanism 20 described above structurally correspond to the respective components of the position detector 10C (illustrated in FIG. 8) according to the third preferred embodiment. More specifically, the magnet 23 structurally corresponds to the magnet 1, and the magnetic sensor unit 22 structurally corresponds to a sensor group formed of the four Hall effect devices 2a, 2b, 2c, and 2d of the position detector 10C. Further, the processing circuit 24 corresponds to a circuit including the two processing circuits and the A/D conversion circuit 4. The processing circuit 24 carries out the same processing as carried out in the third preferred embodiment on each of the output values of the two pairs of Hall effect devices (2a, 2b) and (2c, 2d), and subsequently converts an analog signal into a digital signal and outputs the digital signal to the microcomputer 101.

Because of the inclusion of the foregoing position detection mechanism (which may be referred to as a "position detector"), the image capture apparatus 300A can produce the same advantages as produced by the third preferred embodiment.

To employ the foregoing position detector would be advantageous especially when the foregoing position detector is employed in an image capture apparatus on which demands for size and cost reduction have been increasingly made. To employ the foregoing position detector would reduce influences of piece-to-piece variation of magnets, as well as meet the above-mentioned demands. Also, since the foregoing position detector is of a non-contacting type that detects a position of an object without coming into contact with the object, a further advantage of preventing the foregoing position detector from being a noise source in the image capture apparatus can be produced.

Further, in the present example, the sensor array formed of the Hall effect devices 2a and 2b is situated to extend substantially along the direction of movement of the first actuator 123 (i.e., along the X axis), and the sensor array formed of the Hall effect devices 2c and 2d is situated to extend substantially along the direction of movement of the second actuator 133 (i.e., along the Y axis). Accordingly, a coordinate system used for identifying the coordinate values detected by the magnetic sensor unit 22 is substantially identical to a coordinate system used for controlling the first and second actuators 123 and 133. This eliminates the need of performing coordinate transformation in signal processing to carry out signal processing effectively.

Moreover, as a result of the arrangement of the four Hall effect devices as illustrated in FIG. 8, detection of change in magnetic fields along both the X axis and the Y axis can be achieved simply by providing the magnetic sensor unit 22 in the form of a single sensor package containing four Hall effect devices. Then, simply by providing the magnet 23, which faces the magnetic sensor unit 22, the position detection mechanism 20 capable of detecting positions on the X axis and the Y axis can be implemented. Hence, the arrangement of the Hall effect devices, 2a, 2b, 2c and 2d as illustrated in FIG. 8 is convenient for minimizing of the size of the position detection mechanism 20.

Additionally, in the fifth preferred embodiment, a structure in which the magnetic sensor unit 22 includes four Hall effect devices so that change of a magnet field along each of the X axis and the Y axis can be detected with the use of a single magnetic sensor unit has been described by way of example. Alternatively, a single magnetic sensor unit may be provided for detecting change of a magnetic field along each axis. For example, two magnetic sensors may be provided. One of the two magnetic sensors is situated outwardly from the first actuator 123 and functions to detect a position on the X axis, and the other magnetic sensor is situated outwardly from the second actuator 133 (corresponding to the position of the position detection mechanism 20 described above in the fifth preferred embodiment) and functions to detect a position on the Y axis.

Further, in the fifth preferred embodiment, a case in which an impact actuator employing the piezoelectric element 82 as a drive part is applied in order to move the first and second sliders 14 and 13 each of which is a moving part has been described by way of example. However, the present invention is not limited to this example, and other drive systems or methods may be applied.

F. Sixth Preferred Embodiment

In a sixth preferred embodiment, another specific example of an application of a position detector will be described.

Below, an example in which one of the above-described position detectors is used for detection of a position of a lens in an image capture apparatus will be described.

Figure 19:
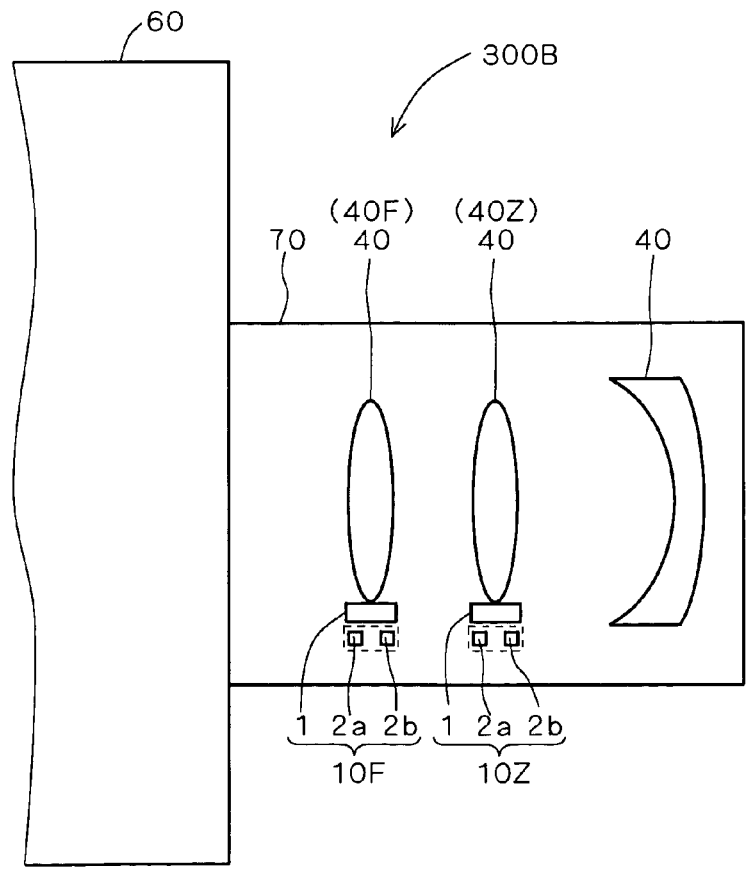
FIG. 19 illustrates another image capture apparatus incorporating a position detector.

FIG. 19 illustrates an image capture apparatus 300B (a digital still camera in the present example).

The image capture apparatus 300B includes the plurality of lenses 40, the camera body 60, the lens barrel 70, and the like. The image capture apparatus 300B has an autofocus function and a zoom function. To this end, the plurality of lenses 40 include a focusing lens 40F and a zoom lens 40Z. Each of the focusing lens 40F and the zoom lens 40Z is movable relative to the lens barrel 70 along an optical axis, independently of each other.

Also, the focusing lens 40F and the zoom lens 40Z are provided with position detectors 10F and 10Z for detecting positions of the lenses 40F and 40Z, respectively.

Each of the position detectors 10F and 10Z is structurally identical to the position detector 10A according to the first preferred embodiment. For example, the position detector 10F includes the magnet 1 and the Hall effect devices 2a and 2b. Likewise, the position detector 10Z includes the magnet 1 and the Hall effect devices 2a and 2b. Further, the processing circuit 3 according to the first preferred embodiment and the like for processing an output of each of the pairs of Hall effect devices of the position detectors 10F and 10Z is included in the camera body 60, though such processing circuit is not illustrated in FIG. 19.

The magnet 1 of the position detector 10F is secured to a bottom of the focusing lens 40F which is a moving part, and the Hall effect devices 2a and 2b of the position detector 10F are secured to an inner face of the lens barrel 70 which is a fixed part. Hence, the position detector 10F is capable of detecting a position of the focusing lens 40F relative to the lens barrel 70 during focusing or the like. The position of the focusing lens 40F is detected by the position detector 10F, and the position of the focusing lens 40F can be controlled using the result of the detection. For example, it is possible to cause the focusing lens 40F to move toward a target position by exercising feedback control or the like.

Similarly, the magnet 1 of the position detector 10Z is secured to a bottom of the zoom lens 40Z which is a moving part, and the Hall effect devices 2a and 2b of the position detector 10Z are secured to the inner face of the lens barrel 70 which is a fixed part. Hence, the position detector 10Z is capable of detecting a position of the zoom lens 40Z relative to the lens barrel 70 during zooming or the like. The position of the zoom lens 40Z is detected by the position detector 10Z, and the position of the zoom lens 40Z can be controlled using the result of the detection. For example, it is possible to cause the zoom lens 40Z to move toward a target position by exercising feedback control or the like.

The image capture apparatus 300B can produce the same advantages as described in the first preferred embodiment. To employ the above-described position detectors would be advantageous, especially when the above-described position detectors are employed in an image capture apparatus on which demands for size and cost reduction have been increasingly made. To employ the above-described position detectors would reduce influences of piece-to-piece variation, as well as meet the above-mentioned demands. Also, since each of the above-described position detectors is of a non-contacting type that detects a position of an object without coming into contact with the object, further advantages of preventing the above-described position detectors from being a noise source in the image capture apparatus, of reducing a drive load, and of avoiding generation of dust which is likely to be generated as a result of sliding or the like, can be produced.

G. Others

Hereinbefore, the preferred embodiments of the present invention have been described. However, the present invention is not limited to the contents in the above description.

For example, though the input voltage Vin is controlled such that a sum of the Hall-effect electromotive forces (Vha+Vhb) is constant in the foregoing preferred embodiments, the present invention is not limited to those preferred embodiments. Alternatively, an input current Iin flowing into the Hall effect devices may be controlled such that a sum of the Hall-effect electromotive forces (Vha+Vhb) is constant.

Further, in the foregoing preferred embodiments, each of the pairs of Hall effect devices 2 (except the pair of Hall effect devices which detects a position on the Z axis in the fourth preferred embodiment) is disposed such that the respective magnetic flux detection axes of the Hall effect devices are oriented in the same direction, and the input voltage Vin is controlled such that a sum of Hall-effect electromotive forces is constant using the Hall effect devices disposed in the foregoing manner. However, the present invention is not limited to those preferred embodiments. For example, the pair of Hall effect devices illustrated in FIG. 3 alternatively may be disposed such that the respective magnetic flux detection axes BD of the two Hall effect devices are oriented in opposite directions. In such alternative example, however, a processing circuit similar to any of the processing circuits 3B, 3C and 3D illustrated in FIGS. 10, 11 and 12, should be used instead of the processing circuit 3. As a result, by obtaining a difference in magnitude between output values of the Hall effect devices 2a and 2b as position outputs, with an input value to the pair of Hall effect devices (2a, 2b) being controlled such that a sum of magnitudes (absolute values) of output values of the Hall effect devices 2a and 2b is constant, it is possible to produce the same advantages as described in the first preferred embodiment and the like.

While the invention has been shown and described in detail, the foregoing description is, in all aspects, illustrative and not restrictive. It is therefore understood that numerous modifications and variations can be devised without departing from the scope of the invention.

What is claimed is:

1. A position detector comprising:
    a magnetic-sensor pair including magnetic sensors spaced from each other;
    a magnetic force generator; and
    a controller for detecting relative positions of said magnetic force generator and said magnetic-sensor pair on a predetermined axis based on respective output values of said magnetic sensors, wherein
    said controller controls input values applied to said magnetic sensors such that a sum of magnitudes of said output values of said magnetic sensors is constant, and then detects a difference in magnitude between said output values of said magnetic sensors as a position output.

2. The position detector according to claim 1, wherein
    a permanent magnet serving as said magnetic force generator is attached to a moving part,
    said magnetic-sensor pair is attached to a fixed part, and
    said controller detects a position of said moving part relative to said fixed part.

3. A position detector comprising:
    a first magnetic-sensor pair including magnetic sensors spaced from each other along a first axis;
    a second magnetic-sensor pair including magnetic sensors spaced from each other along a second axis different from said first axis;
    a magnetic force generator; and a controller for carrying out two-dimensional detection of relative positions of said magnetic force generator and each of said first and second magnetic-sensor pairs based on respective output values of said magnetic sensors included in said first and second magnetic-sensor pairs, wherein said controller controls input values applied to said magnetic sensors included in said first and second magnetic-sensor pairs such that a sum of magnitudes of said output values of said magnetic sensors in each of said first and second magnetic-sensor pairs is constant, and then detects a difference in magnitude between said output values of said magnetic sensors in said first magnetic-sensor pair and a difference in magnitude between said output values of said magnetic sensors in said second magnetic-sensor pair as position outputs for positions on different axes, respectively.

4. The position detector according to claim 3, wherein said first axis and said second axis are perpendicular to each other.

5. The position detector according to claim 3, wherein said magnetic sensors included in said first and second magnetic-sensor pairs are arranged symmetrically with respect to a given point.

6. The position detector according to claim 3, wherein said magnetic force generator is cylindrical.

7. The position detector according to claim 3, wherein,
a permanent magnet serving as said magnetic force generator is attached to a moving part,
said first and second magnetic-sensor pairs are attached to a fixed part, and
said controller detects a position of said moving part relative to said fixed part.

8. A position detector comprising:
a first magnetic-sensor pair including magnetic sensors spaced from each other along a first axis;
a second magnetic-sensor pair including magnetic sensors spaced from each other along a second axis parallel to said first axis;
a magnetic force generator; and
a controller for detecting relative positions of said magnetic force generator and each of said first and second magnetic-sensor pairs on a predetermined axis based on respective output values of said magnetic sensors included in said first magnetic-sensor pair and/or said second magnetic sensor pair, wherein
said controller controls input values applied to said magnetic sensors included in said first and second magnetic-sensor pairs such that a sum of magnitudes of said output values of said magnetic sensors included in each of said first and second magnetic-sensor pairs is constant, and then detects a position output for a position on said predetermined axis based on at least one of a difference in magnitude between said output values of said magnetic sensors included in said first magnetic-sensor pair and a difference in magnitude between said output values of said magnetic sensors included in said second magnetic-sensor pair.

9. A camera-shake compensation mechanism comprising:
a position detector for detecting relative positions of two objects which move relative to each other for compensating for camera shake; and
an actuator for actuating said two objects relative to each other based on results of detection carried out by said position detector, to compensate for said camera shake, wherein,
said position detector includes:
a magnetic-sensor pair including magnetic sensors spaced from each other;
a magnetic force generator; and a controller for detecting relative positions of said magnetic force generator and said magnetic-sensor pair on a predetermined axis based on respective output values of said magnetic sensors included in said magnetic-sensor pair, wherein
said controller controls input values applied to said magnetic sensors such that a sum of magnitudes of said output values of said magnetic sensors is constant, and then detects a difference in magnitude between said output values of said magnetic sensors as a position output.

10. An image capture apparatus comprising:
a position detector for detecting relative positions of two objects which move relative to each other for compensating for camera shake; and
an actuator for actuating said two objects relative to each other based on results of detection carried out by said position detector, to compensate for said camera shake, wherein,
said position detector includes:
a magnetic-sensor pair including magnetic sensors spaced from each other;
a magnetic force generator; and
a controller for detecting relative positions of said magnetic force generator and said magnetic-sensor pair on a predetermined axis based on respective output values of said magnetic sensors, wherein
said controller controls input values applied to said magnetic sensors such that a sum of magnitudes of said output values of said magnetic sensors is constant, and then detects a difference in magnitude between said output values of said magnetic sensors as a position output.

11. An image capture apparatus comprising:
an image-capture optical system including a focusing lens;
a position detector;
a lens-position controller for detecting a position of said focusing lens using said position detector, to control said position of said focusing lens, wherein
said position detector includes:
a magnetic-sensor pair including magnetic sensors spaced from each other; and
a magnetic force generator, wherein
said lens position controller is configured to detect relative positions of said magnetic force generator and said magnetic-sensor pair on a predetermined axis based on respective output values of said magnetic sensors, and wherein
said said lens position controller controls input values applied to said magnetic sensors such that a sum of magnitudes of said output values of said magnetic sensors is constant, and then detects a difference in magnitude between said output values of said magnetic sensors as a position output.

12. An image capture apparatus comprising:
an image-capture optical system including a zoom lens;
a position detector;
a lens-position controller for detecting a position of said zoom lens using said position detector, to control said position of said zoom lens, wherein
said position detector includes:
a magnetic-sensor pair including magnetic sensors spaced from each other;
a magnetic force generator; and
a controller for detecting relative positions of said magnetic force generator and said magnetic-sensor pair on a predetermined axis based on respective output values of said magnetic sensors, wherein said said lens position controller controls input values applied to said magnetic sensors such that a sum of magnitudes of said output values of said magnetic sensors is constant, and then detects a difference in magnitude between said output values of said magnetic sensors as a position output.

* * * * *